US010459455B2

(12) United States Patent
Punithan et al.

(10) Patent No.: US 10,459,455 B2
(45) Date of Patent: Oct. 29, 2019

(54) VEHICLE CONTROL APPARATUS AND VEHICLE INCLUDING THE SAME

(71) Applicant: LG Electronics Inc., Seoul (KR)

(72) Inventors: Xavier Punithan, Karnataka (IN); Hyunho Ki, Seoul (KR); Juhnho Park, Seoul (KR); Hansung Kim, Seoul (KR); Jaeseung Bae, Seoul (KR); Jaehwan Yoon, Seoul (KR); Suho Park, Seoul (KR)

(73) Assignee: LG Electronics Inc., Seoul (KR)

( * ) Notice: Subject to any disclaimer, the term of this patent is extended or adjusted under 35 U.S.C. 154(b) by 172 days.

(21) Appl. No.: 15/644,484

(22) Filed: Jul. 7, 2017

(65) Prior Publication Data

US 2018/0032086 A1    Feb. 1, 2018

Related U.S. Application Data

(60) Provisional application No. 62/367,653, filed on Jul. 28, 2016.

(30) Foreign Application Priority Data

Jan. 2, 2017    (KR) ........................ 10-2017-0000420

(51) Int. Cl.
*G05D 1/00* (2006.01)
*G05D 1/02* (2006.01)
*G08G 1/00* (2006.01)

(52) U.S. Cl.
CPC ......... *G05D 1/0295* (2013.01); *G05D 1/0016* (2013.01); *G05D 1/0027* (2013.01);
(Continued)

(58) Field of Classification Search
None
See application file for complete search history.

(56) References Cited

U.S. PATENT DOCUMENTS 9,927,816 B2 *   3/2018   Li ........................... B60K 31/00
10,073,464 B2 *  9/2018   Pilkington ........... G05D 1/0295
(Continued)

FOREIGN PATENT DOCUMENTS

EP    2390744    11/2011
EP    2557393    8/2012
(Continued)

OTHER PUBLICATIONS

Extended European Search Report in European Application No. 17001254.6, dated Dec. 12, 2017, 8 pages.

*Primary Examiner* — Truc M Do
(74) *Attorney, Agent, or Firm* — Fish & Richardson P.C.

(57) ABSTRACT

A vehicle control apparatus of an autonomous driving vehicle performing autonomous driving includes a display, a wireless communication unit transmitting and receiving a message to and from a certain vehicle positioned within a predetermined range, and a controller controlling the display on the basis of a message received through the wireless communication unit, wherein the controller turns on or off a group driving mode on the basis of a user input, and when the group driving mode is turned on, the controller controls the display to display a list of candidate vehicles which may be included in a group among vehicles positioned within the predetermined range.

18 Claims, 24 Drawing Sheets

(52) U.S. Cl.
CPC ......... *G05D 1/0276* (2013.01); *G05D 1/0293* (2013.01); *G08G 1/22* (2013.01)

(56) References Cited

U.S. PATENT DOCUMENTS

| | | | | |
|---|---|---|---|---|
| 2013/0080041 | A1* | 3/2013 | Kumabe | G05D 1/024 |
| | | | | 701/117 |
| 2014/0107867 | A1* | 4/2014 | Yamashiro | G08G 1/22 |
| | | | | 701/2 |
| 2014/0282093 | A1* | 9/2014 | Burke | H04W 4/029 |
| | | | | 715/753 |
| 2014/0316865 | A1* | 10/2014 | Okamoto | G08G 1/22 |
| | | | | 705/14.1 |
| 2015/0294430 | A1* | 10/2015 | Huang | G06Q 50/26 |
| | | | | 705/7.24 |
| 2016/0267796 | A1* | 9/2016 | Hiroma | G08G 1/22 |
| 2017/0344023 | A1* | 11/2017 | Laubinger | G05D 1/0272 |

FOREIGN PATENT DOCUMENTS

| | | |
|---|---|---|
| JP | 2001357491 | 12/2001 |
| JP | 2010146428 | 7/2010 |
| JP | 2013054027 | 3/2013 |
| JP | 5947291 | 7/2016 |

* cited by examiner

Real Surrounding Environment

Collected Radar Sensor Data from Neighbors

Cooperative Radar Sensor Fusion

Track & Object Estimation

OR

VEHICLE CONTROL APPARATUS AND VEHICLE INCLUDING THE SAME

CROSS-REFERENCE TO RELATED APPLICATION

Pursuant to 35 U.S.C. § 119(a), this application claims the benefit of an earlier filing date of and the right of priority to Korean Application No. 10-2017-0000420, filed on Jan. 2, 2017, and also claims the benefit of U.S. Provisional Application No. 62/367,653, filed on Jul. 28, 2016, the contents of which are incorporated by reference herein in their entirety.

BACKGROUND OF THE INVENTION

1. Field of the Invention

The present disclosure relates to a vehicle control apparatus and a vehicle including the same.

2. Background of the Invention

A vehicle refers to a means of transportation for moving people or a load using kinetic energy. Typical examples of the vehicle may be an automobile and a motor cycle.

For the purpose of safety and convenience of users who use vehicles, various sensors and devices are provided in vehicles and functions of vehicles have been diversified.

Functions of vehicles may be divided into a convenience function for promoting drivers' convenience and a safety function for promoting safety of drivers and/or pedestrians.

First, the convenience function has development motives related to drivers' convenience such as providing an infotainment (information+entertainment) function to vehicles, supporting a partial autonomous driving function, or assisting a driver to secure a visual field at night or in a blind spot. For example, the convenience function includes active cruise control (ACC), a smart parking assist system (SPAS), a night vision (NV), a head-up display (HUD), an around view monitor (AVM), an adaptive headlight system (AHS), and the like.

The safety function is a technique of securing driver's safety and/or pedestrian's safety, including a lane departure warning system (LDWS), a lane keeping assist system (LKAS), an autonomous emergency braking (AEB) function, and the like.

As a vehicle is automated, a spatial relationship of a predetermined range based on the vehicle, as well as a position of a vehicle, should be accurately defined in order to control a risk of an accident. Here, the spatial relationship is a relationship between a plurality of elements including a vehicle within the predetermined range, and refers to a relative position between the vehicle and each object positioned within the predetermined range. That is, the vehicle accurately recognizes a 3-dimensional spatial relationship corresponding to up, down, left, and right sides and front and rear sides by itself, and defines a relative position of every object positioned within a space in relation to a position of the vehicle.

The spatial relationship is defined by information collected from sensors, and various applications related to driving execute various functions on the basis of the defined spatial relationship. In order for the various executed functions to operate without an error, the defined spatial relationship is required not to have an error.

In order to accurately define the spatial relationship, various sensors have been developed. For example, sensors such as a radar (radio detecting and ranging) detecting an object using microwaves, LiDAR (light detection and ranging), using near infrared ray, a camera using visible light, and an ultrasonic sensor using ultrasonic waves are provided in a vehicle, and the vehicle detects an object by putting every information received from the sensors together, and define a spatial relationship including the detected object.

However, when an obstacle blocking radiowaves is present, a blind spot is formed due to characteristics of radiowaves having straightness, and a spatial relationship regarding such a blind spot cannot be defined although sensors provided in a vehicle become accurate. Thus, low reliability of position information caused by environmental limitations remains to be resolved.

SUMMARY OF THE INVENTION

Therefore, an aspect of the detailed description is to solve the aforementioned problems and any other problems.

Another aspect of the detailed description is to provide a vehicle control apparatus capable of accurately defining a spatial relationship and a vehicle including the same.

Another aspect of the detailed description is to provide a vehicle control apparatus allowing an occupant to recognize by intuition a spatial relationship based on a vehicle in which the occupant is placed, and a vehicle including the same.

Another aspect of the detailed description is to provide a vehicle control apparatus capable of realizing group driving (or platooning) on the basis of an accurately defined spatial relationship and allowing an occupant to simply set or reset a group, and a vehicle including the same.

Another aspect of the detailed description is to provide a vehicle control apparatus allowing an occupant to simply execute various functions of group driving, and a vehicle including the same.

Another aspect of the detailed description is to provide a vehicle control apparatus allowing occupants placed in different vehicles of group driving to perform communication with each other, and a vehicle including the same.

Another aspect of the detailed description is to provide a vehicle control apparatus allowing an occupant to accurately recognize an amount of external messages received by a vehicle in which the occupant is placed, and a vehicle including the same.

To achieve these and other advantages and in accordance with the purpose of this specification, as embodied and broadly described herein, a vehicle control apparatus includes: a display; a wireless communication unit transmitting and receiving a message to and from a certain vehicle positioned within a predetermined range; and a controller controlling the display on the basis of a message received through the wireless communication unit, wherein the controller turns on or off a group driving mode on the basis of a user input, and when the group driving mode is turned on, the controller controls the display to display a list of candidate vehicles which may be included in a group among vehicles positioned within the predetermined range.

According to an embodiment, when a vehicle is included in the group in a state in which the group driving mode is turned on, the controller may control the display to output a message list related to group driving, and when at least one message of the message list is selected, the controller may control the wireless communication unit to transmit the selected message to the vehicle included in the group.

According to an embodiment, when an approval message regarding the selected message is received from the vehicle to which the selected message was transmitted, the controller may execute a group driving function corresponding to the selected message.

According to an embodiment, when a rejection message, rather than the approval message, is received, the controller may limit execution of the group driving function corresponding to the selected message and control the display to output notification information indicating that the rejection message is received.

According to an embodiment, any one function which can be executed as the group driving function may include deceleration, acceleration, parking, a change in lane, adjustment of a space between vehicles, a change in a master vehicle as a reference of group driving, and a change in a destination.

According to an embodiment, the executed group driving function may be varied according to the selected message.

According to an embodiment, when a plurality of vehicles are included in the group, the selected message may be selectively transmitted to one or more vehicles selected by a user input among the vehicles included in the group.

According to an embodiment, the controller may edit or delete a message included in the message list or add a new message to the message list.

According to an embodiment, a message received by the wireless communication unit may be processed differently depending on ON or OFF of the group driving mode.

According to an embodiment, when the group driving mode is turned on, the controller may preferentially process a message received from a vehicle included in the group, over a message received from a vehicle not included in the group.

According to an embodiment, when the group driving mode is turned on, the controller may disregard a message received from the vehicle not included in the group.

According to an embodiment, the controller may control the wireless communication unit to transmit a group request message to at least one candidate vehicle selected by a user input from the list, and when an approval message regarding the group request message is received, a candidate vehicle which has transmitted the approval message may be added to the group.

According to an embodiment, in displaying the list, a vehicle included in the group may be highlighted such that the vehicle included in the group and the vehicle not included in the group are distinguished from each other.

According to an embodiment, when the group driving mode is turned off in a state in which the group is set, the group may be released.

According to an embodiment, when the list is displayed, a main object corresponding to a main vehicle including the controller and a sub-object corresponding to any candidate vehicle included in the group may be displayed, and a position in which the sub-object is displayed may be varied according to a relative position of the any candidate vehicle regarding the main vehicle.

According to an embodiment, the display may display a map including a position of the main vehicle including the controller, and the controller may change a scale of the map on the basis of a position of the any candidate vehicle included in the group.

According to an embodiment, when the any candidate vehicle moves out from a reference distance, the controller may control the wireless communication unit to transmit a warning message to the any candidate vehicle.

According to an embodiment, a graphic object indicating an amount of messages received from vehicles positioned within the predetermined range for a unit time may be displayed on the display.

According to an embodiment, when the group driving mode is turned on, the graphic object may indicate an amount of messages received from vehicles included in the group for the unit time, and when the group driving mode is turned off, the graphic object may indicate an amount of messages received from every vehicle for the unit time.

The present disclosure may extend to a vehicle including at least one vehicle control apparatus described above.

The autonomous driving vehicle and the control method thereof have the following advantages.

In a vehicle which moves at a high speed, GPS information is very inaccurate information and a spatial relationship may not be perfectly defined only by a sensor provided in the vehicle. In order to solve the aforementioned problem, the present disclosure may provide a more accurate spatial relationship to a vehicle and an application installed in the vehicle. According to the present disclosure, as more messages are received by the vehicle, a spatial relationship of a vehicle is more perfectly defined and reliability of various functions using the spatial relationship is increased. In addition, since only a reliable message is selectively used in the group driving mode, a load is small and a message is not required to be verified, relative to the general driving mode.

According to an embodiment of the present disclosure, since the user may select the general driving mode or the group driving mode as a scheme to receive a V2X message, an optimal communication scheme fitting a situation may be selected.

Also, when the group driving mode starts, a user interface reflecting a position of a vehicle in real time and an occupant may simply add at least one vehicle to a group using the user interface.

According to an embodiment of the present disclosure, in the case of group driving, a message list formed to select a group driving function which can be commonly executed by vehicles included in a group may be displayed on the vehicles. An occupant placed in any one of the vehicles may select any one message of the message list to execute a common function of the vehicles. Accordingly, one common function may be executed in the plurality of vehicles.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car.

The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
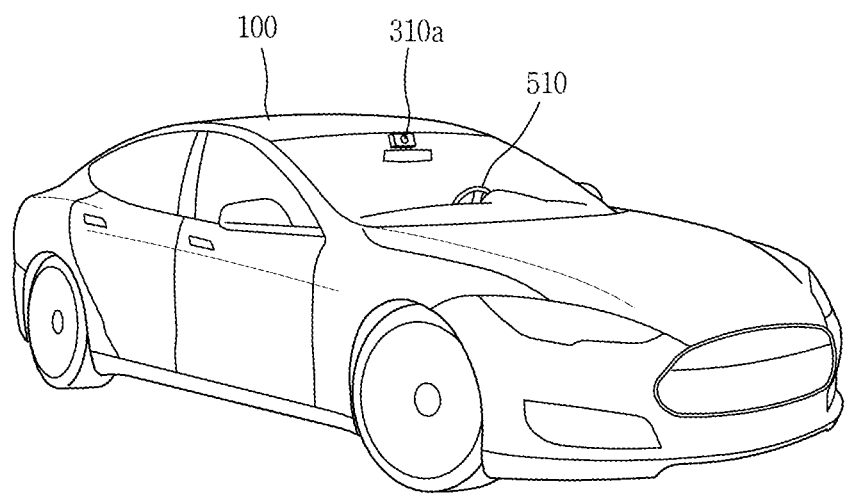
FIG. 1 is a view illustrating an appearance of a vehicle according to an embodiment of the present disclosure.
Figure 1:
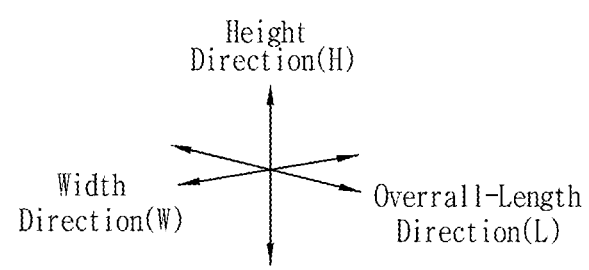

FIG. 1 is a view illustrating appearance of a vehicle in accordance with an embodiment of the present invention.

Figure 2:
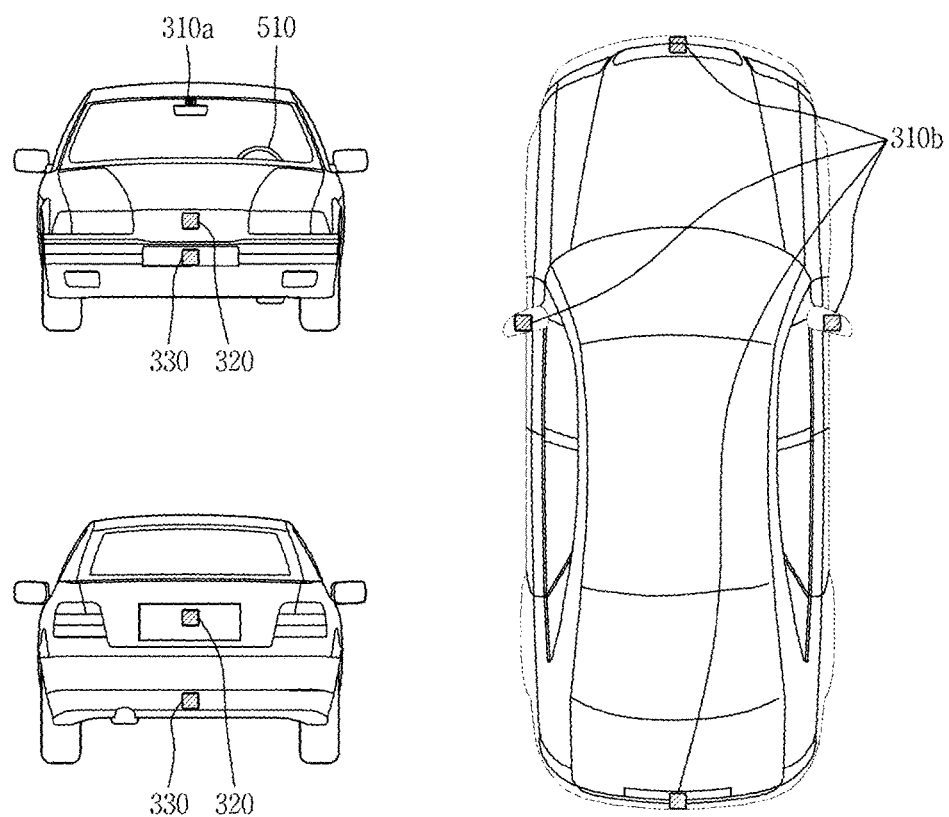
FIG. 2 is a view illustrating a vehicle according to an embodiment of the present disclosure viewed at various angles.

FIG. 2 is a view illustrating appearance of a vehicle at various angles in accordance with an embodiment of the present invention.

Figure 3:
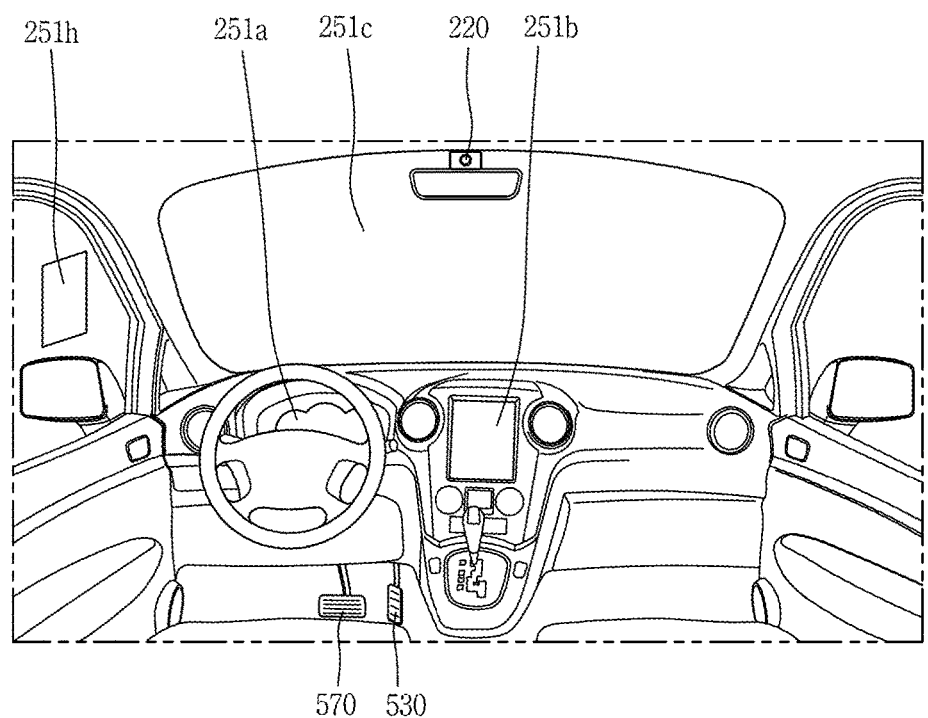
FIGS. 3 and 4 are views illustrating the inside of a vehicle according to an embodiment of the present disclosure.
Figure 4:
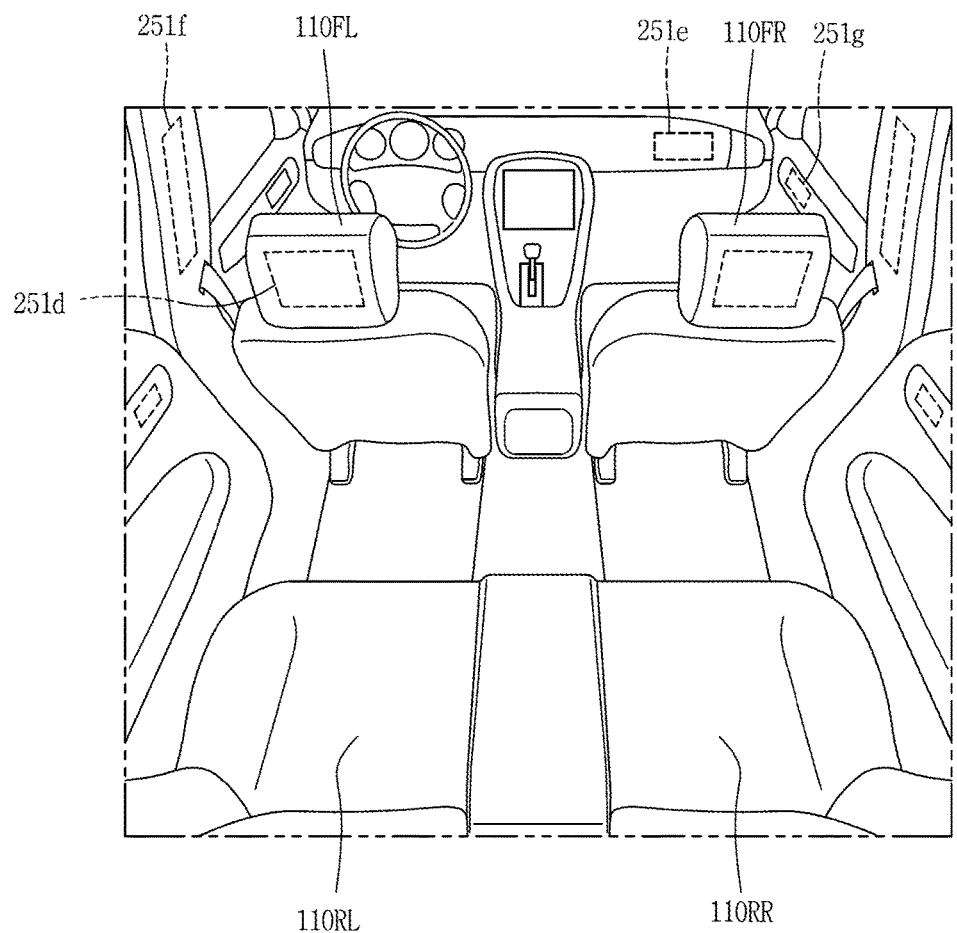

FIGS. 3 and 4 are views illustrating an inside of a vehicle in accordance with an embodiment of the present invention.

Figure 5:
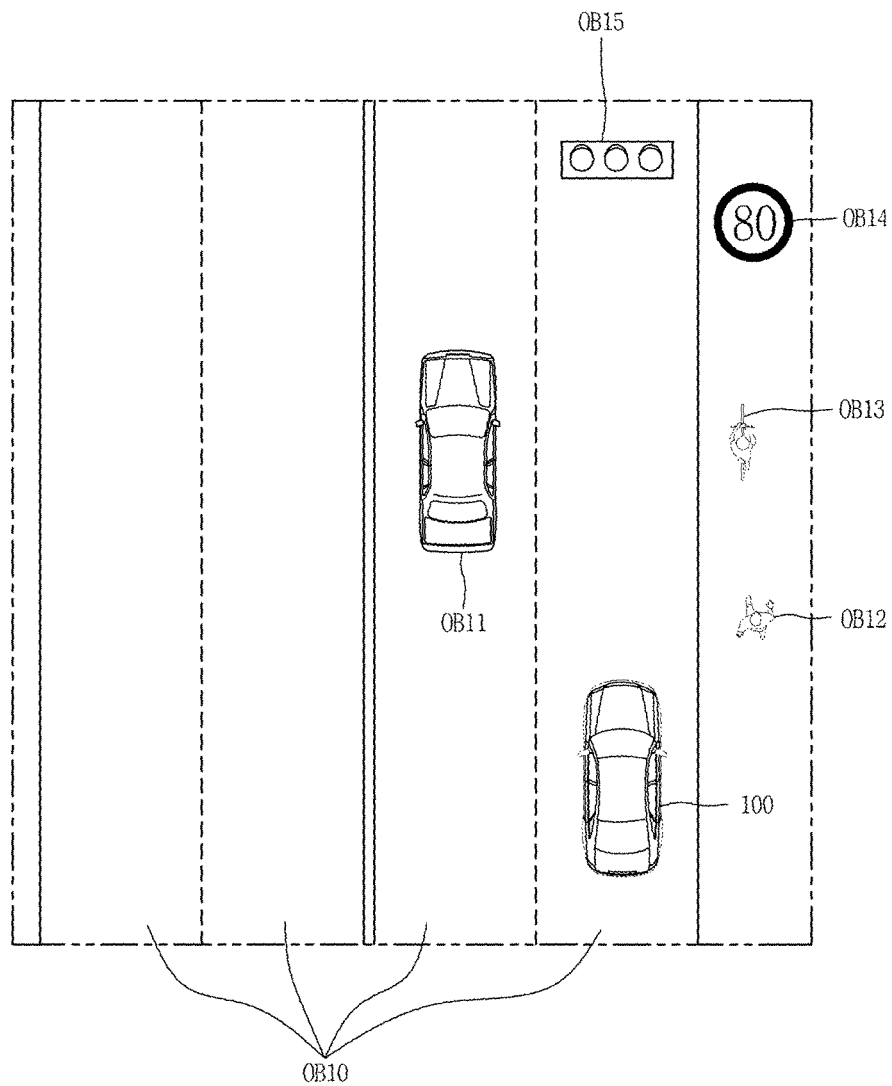
FIGS. 5 and 6 are views referred to in explaining an object according to an embodiment of the present disclosure.
Figure 6:
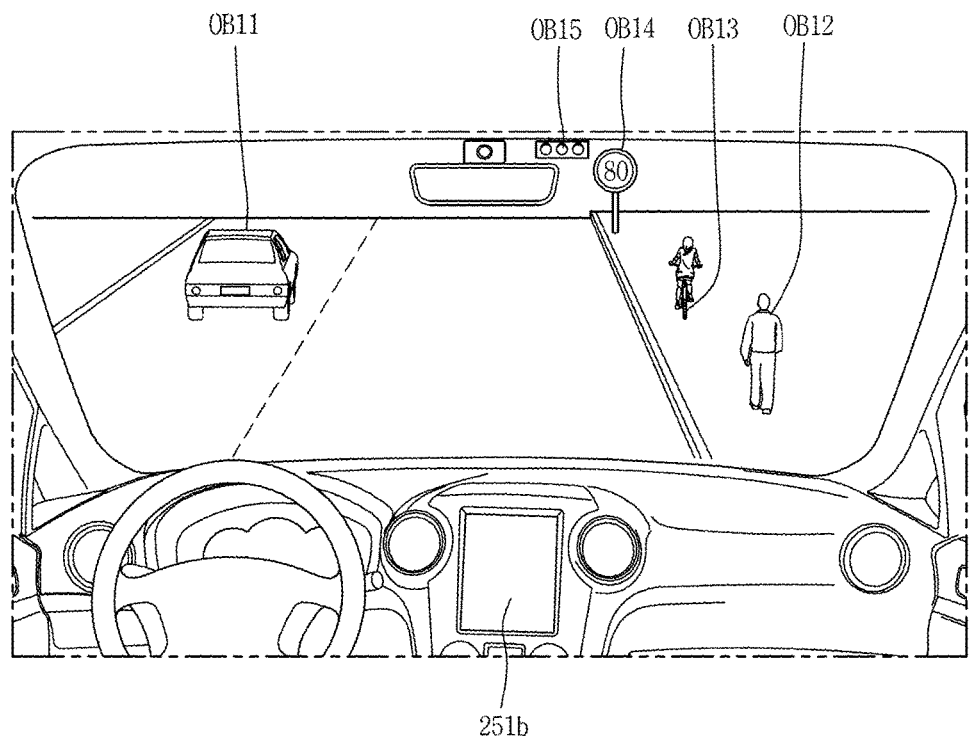

FIGS. 5 and 6 are reference views illustrating objects in accordance with an embodiment of the present invention.

Figure 7:
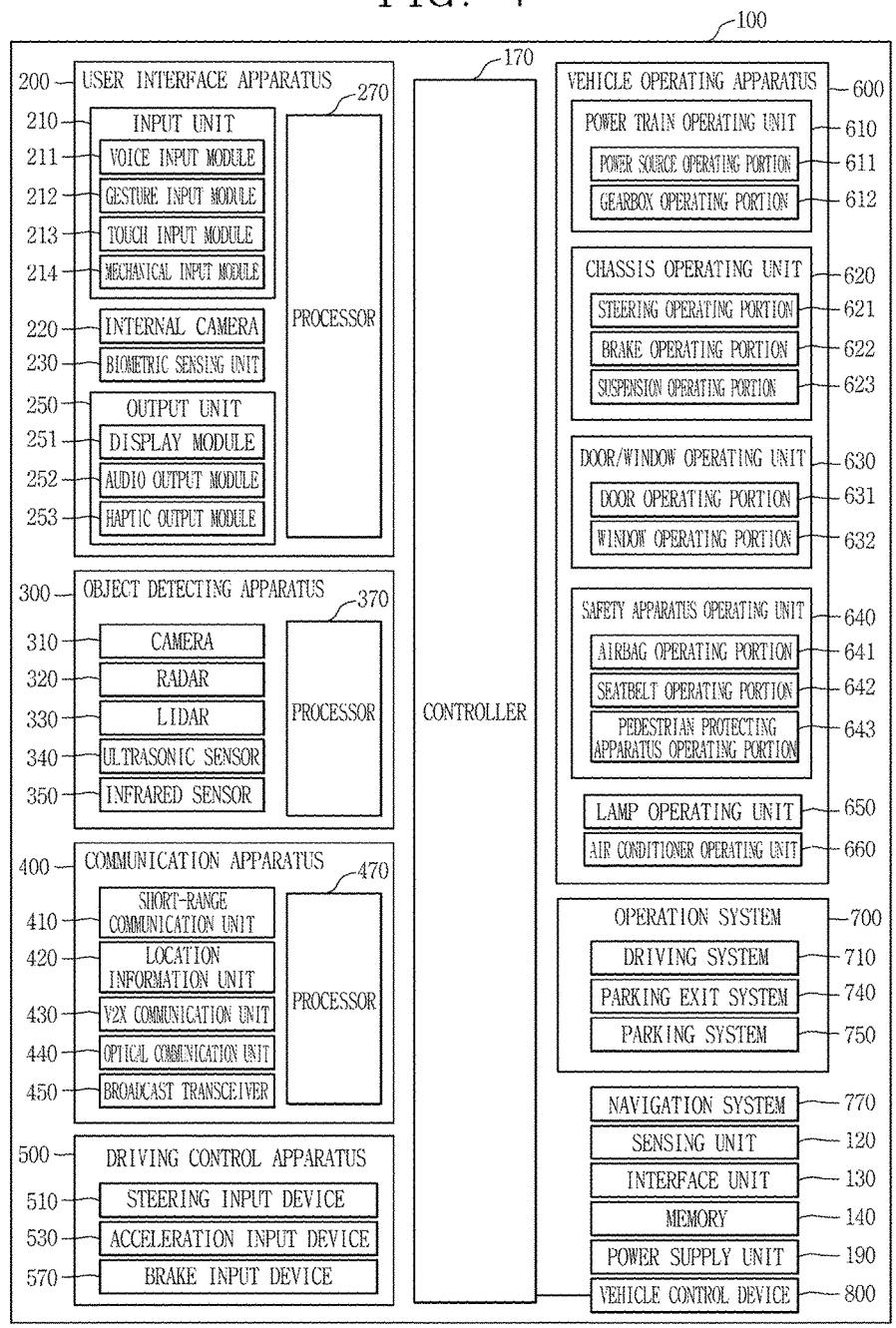
FIG. 7 is a block diagram referred to in explaining a vehicle according to an embodiment of the present disclosure.

FIG. 7 is a block diagram illustrating a vehicle in accordance with an embodiment of the present invention As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, a operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 210 may be disposed within the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

A vehicle control apparatus is a device which can be physically separated from a vehicle and controls the vehicle, and includes a display, a wireless communication unit, and a controller controlling the display and the wireless communication unit.

The vehicle control apparatus may include at least one of the components of the vehicle 100 described above with reference to FIG. 7, and the controller of the vehicle control apparatus may be the controller 170 described above with reference to FIG. 7.

Hereinafter, a control operation of the vehicle control apparatus and a vehicle including the same will be described in detail.

Figure 8:
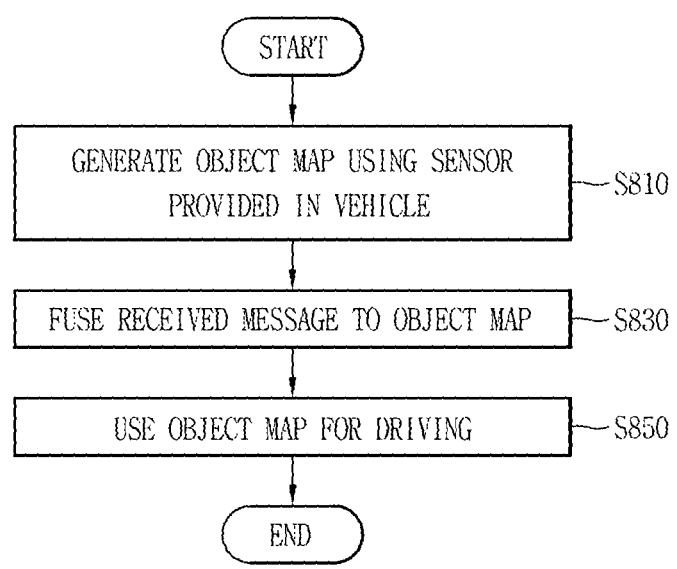
FIG. 8 is a flow chart illustrating a method for defining a spatial relationship by a vehicle control apparatus according to the present disclosure.

FIG. 8 is a flow chart illustrating a method for defining a spatial relationship by a vehicle control apparatus according to the present disclosure, and FIGS. 9, 10A, 10B, 10C and 10D are views illustrating an object map generated according to the control method of FIG. 8.

Various advanced driver assistance systems, as active safety systems for assisting a driver to conveniently and safely drive a vehicle and preventing an accident from happening, have been developed.

According to the advanced driver assistance system, a vehicle collects information through a sensor serving as an eye and an ear of the vehicle, recognizes a spatial relationship, and performs various vehicle controlling on the basis of the recognized spatial relationship.

For example, when a relative position between the vehicle and a lane is defined, a warning of a lane departure warning system may be output. In another example, when a relative position between the vehicle and an object having a possibility of a collision is defined, autonomous emergency braking may be executed.

In order to define an accurate spatial relationship, various sensors have been developed, but there is a problem in which only sensors provided in a vehicle cannot measure a blind spot. A space which may not be defined due to an environmental factor may be present, and such a blind spot lowers reliability regarding decision making of the vehicle.

In order to solve the problem, communication may be used. In detail, a vehicle may communicate with an infrastructure fixated in a road or another vehicle on the move to exchange and share various types of information and may fuse communication information collected through communication to sensor information collected through a sensor to reinforce an insufficient part of sensor information.

A method for fusing communication information to sensor information is illustrated in detail in FIG. 8.

First, the vehicle control apparatus creates an object map using a sensor provided in the vehicle (S810).

The sensor, which is the sensing unit 120 described above with reference to FIG. 7, includes at least one of a radar, a lidar, a camera sensor, an ultrasonic sensor, an infrared sensor, and a GPS. In addition, any type of sensors provided in the vehicle may be used to create the object map.

The object map refers to a map regarding a predetermined range which may be sensed by the vehicle and may be configured as at least one of two-dimensional to four-dimensional coordinate system based on one point of the vehicle as starting point. For example, in cases where the object map is configured as a four-dimensional coordinate system, four-dimensional axes may be a latitude, a longitude, an altitude, and time, and a starting point may be the center of gravity.

The object map may include a map image based on a latitude, a longitude, and an altitude.

Figure 9:
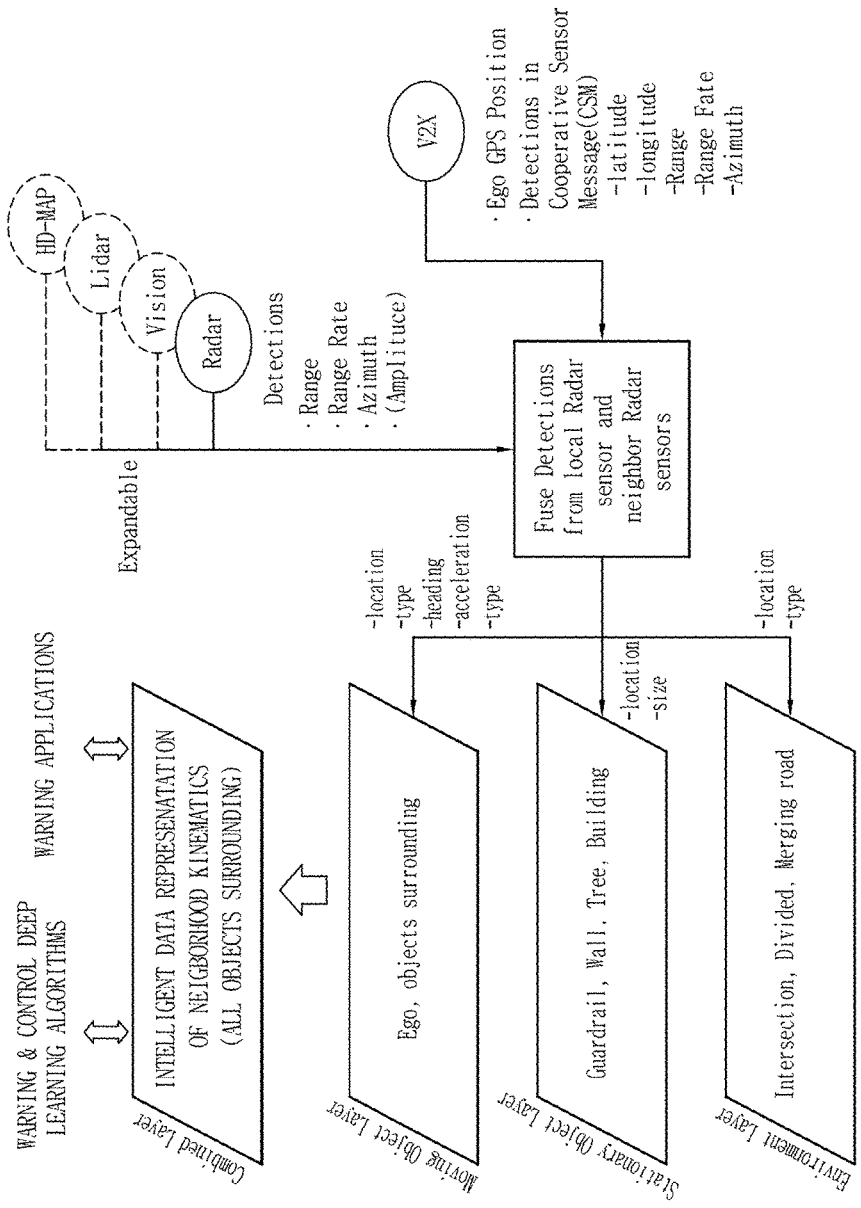
FIGS. 9, 10A, 10B, 10C and 10D are views illustrating an object map generated according to the control method of FIG. 8.

Also, as illustrated in FIG. 9, the object map may include at least one of a first layer (or an environment layer), a second layer (or a stationary object layer), and a third layer (or a moving object layer).

The first layer includes matters regarding a road in which a vehicle is driving. For example, matters regarding the number of drive ways, lanes, an intersection, a divided road, a merging road, and the like, may be expressed as coordinates on the first layer.

The vehicle control apparatus may match the map image to the first layer generated by the sensor information to more accurately specify a location thereof.

The second layer may include matters regarding a fixated object, and the third layer includes matters regarding a moving object. For example, matters regarding a traffic light, a guard rail, a wall, tree, a building, and the like, are expressed as coordinates on the second layer, and matters regarding a pedestrian, another vehicle, and the like, may be expressed as coordinates on the third layer. Here, a position and a size of an object may be expressed by a plurality of coordinates.

At least one of a first to third layers may be combined to a map image to generate an object map (or a combined layer) including only sensor information.

Meanwhile, the vehicle control apparatus fuses the message received through the wireless communication unit to the object map (S830).

The vehicle control apparatus fuses information included in the message to the object map including only sensor information collectively in consideration of a time at which the message was created and a time required for sending the message. In this manner, a final object map in which sensor information and communication information are fused is generated.

The message includes sensor information generated by a device which has sent the message, and the message is used as communication information in a receiver vehicle. The message may further include an identification number of the vehicle which has created the message, a message creation time, and location information of a point where the message was created.

For example, when the vehicle control apparatus is a first vehicle, the first vehicle may generate first sensor information with respect to a location of the first vehicle, and a second vehicle located at a different point generates second sensor information with respect to a location of the second vehicle. When the second vehicle is positioned within a predetermined range with respect to the first vehicle, the first vehicle may receive second sensor information transmitted from the second vehicle. Here, the first vehicle may fuse the second sensor information to the first sensor information to enhance accuracy of the object map.

Here, the message may be transmitted and received in various manners. For example, the message may be transmitted and received through wireless communication between vehicles (vehicle-to-vehicle (V2V)), wireless communication between a vehicle and an infrastructure (vehicle-to-infrastructure (V2I), in-vehicle networking (IVN), communication between a vehicle and a mobile terminal (vehicle-to-pedestrian (V2P), communication between a vehicle and a thin through a wired/wireless network (vehicle-to-everything (V2X), and the like.

Figure 10A:
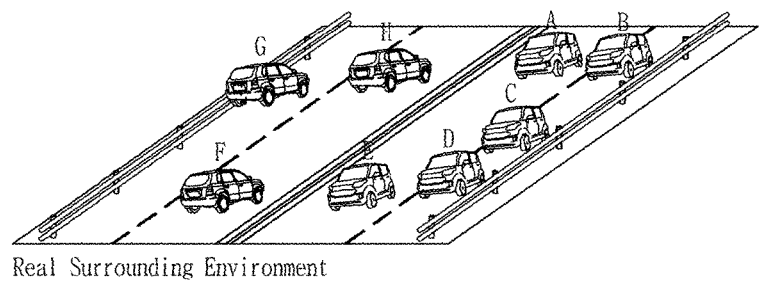

FIG. 10A illustrates an example of eight vehicles (A-H)) positioned within a predetermined range at a timing t. Each vehicle may broadcast sensor information generated thereby or may directly transmit the sensor information to another vehicle positioned within the predetermined range.

When it is assumed that every vehicle has completed message transmission and reception, each vehicle has a total of eight pieces of sensor information including sensor information of its own and seven pieces of sensor information generated by other vehicles.

Figure 10B:
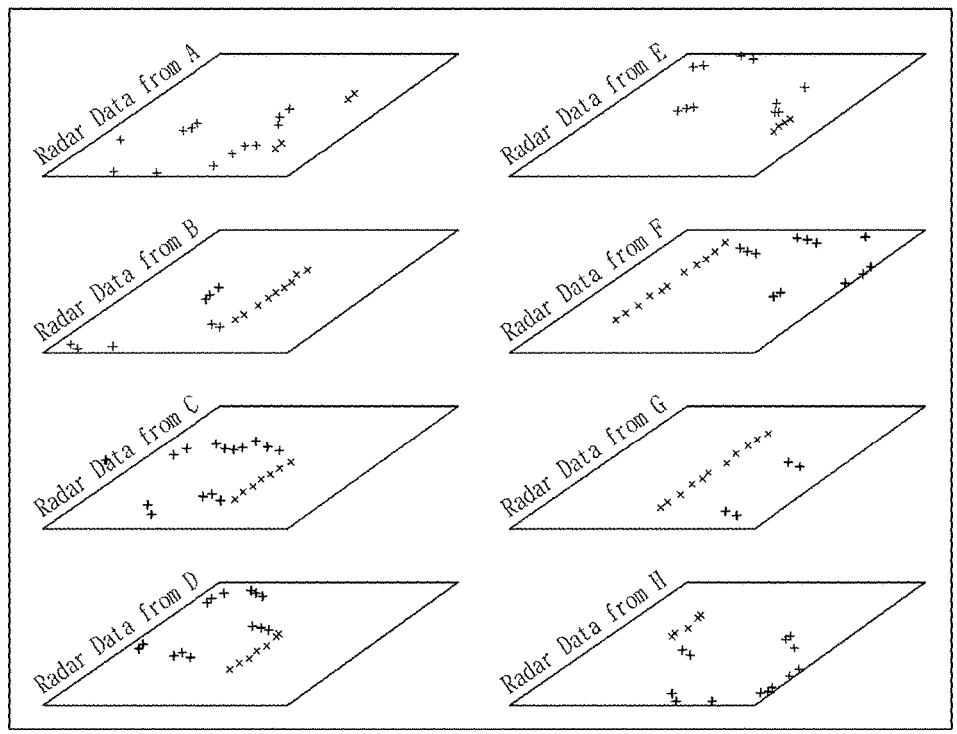

FIG. 10B illustrates an example of an object map expressed by 2D coordinate system, as sensor information generated by a radar of each vehicle.

A maximum coordinate range of the object map generated by each vehicle may be varied depending on a sensor provided in each vehicle. As a sensor has better capability, a larger range of object map may be generated.

Meanwhile, since each vehicle is positioned at a different point, a coordinate range of each object map generated by each vehicle is different. Here, each vehicle may extract only at least some of object maps of other vehicles which can be mapped to an object map of its own, among from the object maps of the other vehicles, and fuses the extracted object maps to the object map of its own. In another example, each vehicle may extend a spatial relationship to a region not included in an object map of its own using the object maps of other vehicles.

Figure 10C:
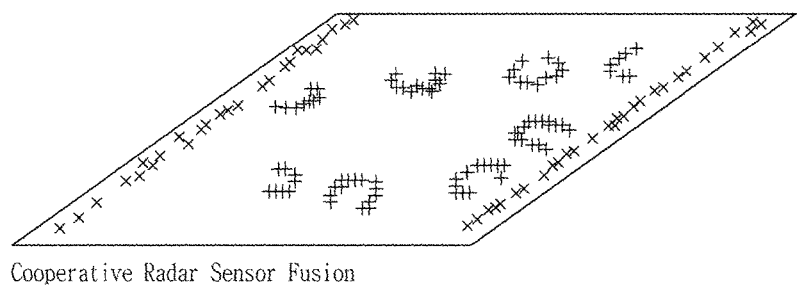

FIG. 10C illustrates a final object map into which eight object maps are fused.

Figure 10D:
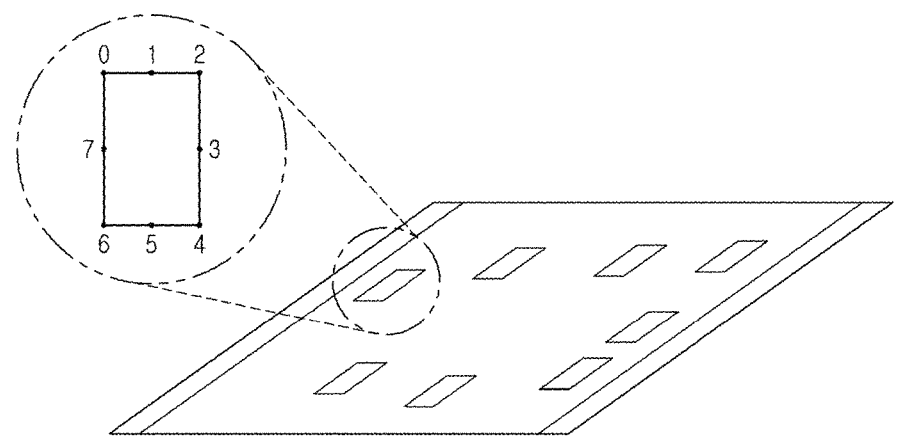

The vehicle control apparatus may process the final object map illustrated in FIG. 10C by an internal algorithm to such thing as illustrated in FIG. 10D.

In detail, when an object is searched, the vehicle control apparatus may process a searched object to that illustrated in FIG. 10D using eight reference points. The first reference point 0 to eighth reference point 7 are sequentially assigned with respect to a movement direction of the object. Accordingly, the searched object is standardized by the eight reference points surrounding the object and a movement direction of the object may be checked.

For example, when a case in which a vehicle A uses only sensor information generated by the vehicle A (FIG. 10B) and a case in which the vehicle A fuses sensor information generated by other vehicles (FIG. 10C) are compared, a difference may be easily confirmed. As a larger pieces of information are fused, reliability thereof is increased and an object may be more accurately identified.

Next, the vehicle control apparatus uses the fused object map in driving (S850).

A final object map in which sensor information and communication are fused is provided to various applications installed in a vehicle, and an application may output a notification on the basis of the final object map or execute various functions related to driving.

When there is no received message, fusing is not performed, and an unmerged object map is used in driving. In other words, an object map generated only by sensor information is used in driving.

In a vehicle which moves at a high speed, GPS information is very inaccurate information and a spatial relationship may not be perfectly defined only by a sensor provided in the vehicle. In order to solve the aforementioned problem, the present disclosure may provide a more accurate spatial relationship to a vehicle and an application installed in the vehicle. According to the present disclosure, as more messages are received by the vehicle, a spatial relationship of a vehicle is more perfectly defined and reliability of various functions using the spatial relationship is increased.

Meanwhile, the vehicle control apparatus according to the present disclosure may turn on or off a group driving mode on the basis of a user input. The user input may be performed in various manners. For example, in a state in which a first passenger who carries a first terminal may be placed in a first vehicle and a second client who carries a second terminal is placed in a second vehicle, a group invitation message may be transmitted from the first terminal to the second terminal. The first terminal may transmit the group invitation message to the second terminal according to a request from the first client. When the second client approves the invitation using the second terminal, the first vehicle and the second vehicle set a group on the basis of information included in the group invitation message and start group driving.

Group driving defined in the present disclosure refers to freely driving toward a destination set of each vehicle, sharing sensor information generated by each vehicle, and driving using the shared information, rather than that vehicles are driving abreast in a state in which the vehicles are spaced apart from each other at a predetermined interval, toward the same destination.

For example, in cases where a group including the first and second vehicles starts group driving, the first and second vehicles may drive using different drive ways. A destination of the first vehicle and a destination of the second vehicle may be the same or different. Here, a first importance of group driving lies in that the first vehicle fuses sensor information generated by the second vehicle to sensor information generated by the first vehicle.

When group driving starts, the first vehicle may share various group driving functions with the second vehicle, and may display a message list for the user to select a group driving function to be executed.

For example, the message list may include a deceleration message, and when the deceleration message is selected by a passenger placed in the first vehicle, the deceleration message may be transferred from the first vehicle to the second vehicle, and the second vehicle may decelerate the vehicle in response to the deceleration message.

In addition, the first vehicle may request the second vehicle to decelerate, accelerate, park, change a lane, adjust a space between vehicles, or change a destination according to a message selected by the passenger of the first vehicle. In response to the request from the first vehicle, the second vehicle may automatically execute a corresponding function or output notification information indicating the request from the first vehicle in visual, audible, and tactile manners.

Also, when group driving starts, a menu regarding a function commonly executed by all the vehicles included in the group may be displayed. The same function may be executed by all the vehicles included in the group by a user input applied to the menu.

A second importance of group driving lies in that a user interface allowing the plurality of vehicles included in the same group to execute the same driving function is output and the plurality of vehicles included in the group execute the same driving function according to a request from a passenger placed in a specific vehicle.

Finally, a third importance of group driving likes in that a message received from a vehicle included in the group is preferentially displayed. Since a message is received from an unspecific vehicle, messages are received from various objects according to a driving environment. However, when group driving starts, the vehicle control apparatus may preferably extract a message received from a vehicle included in the group and display the extracted message on the display. Accordingly, a passenger may preferentially check information of another vehicle included in the group.

Meanwhile, each of the vehicles included in the group may perform autonomous driving and/or manual driving to a destination. Autonomous driving refers to driving in which at least one of acceleration and a driving direction is determined according to a preset algorithm, and manual driving refers to driving in which acceleration and a driving direction are determined by a driver's operation.

Various embodiments related to a group driving mode will be described with reference to FIGS. 11 and 12.

Figure 11:
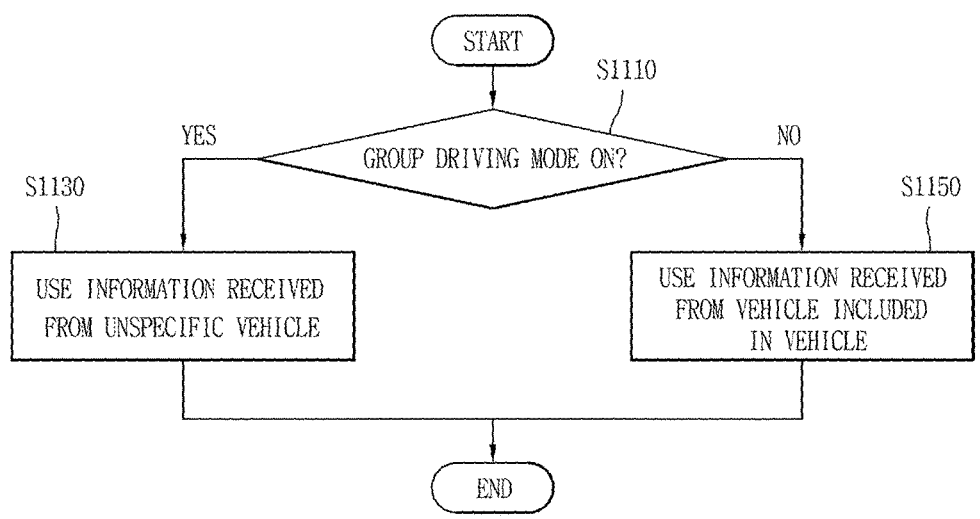
FIG. 11 is a flow chart illustrating a method for generating an object map in different manners according to a group driving mode.

FIG. 11 is a flow chart illustrating a method for generating an object map in different manners according to a group driving mode.

The vehicle control apparatus may execute a general driving mode (or a safety message application) or a group driving mode (or a traveling companion application).

The vehicle control apparatus may determine whether the group driving mode is ON (S1110), and use a message received from the outside in different manners according to a determination result. Processing of a message received by a wireless communication unit is varied depending ON or OFF of the group driving mode.

When the group driving mode is OFF, the vehicle control apparatus operates in the general driving mode, and when the group driving mode is ON, the vehicle control apparatus operates in the group driving mode.

The general driving mode refers to a mode in which an unspecific message broadcast or directly transmitted to a vehicle is received. Here, the vehicle control apparatus uses every message received from an unspecific vehicle in generating an object map (S1130).

The group driving mode refers to a mode in which a message received from a vehicle included in the group is used in generating an object map (S1150).

When the group driving mode is turned on, the vehicle control apparatus may preferentially process a message received from a vehicle included in the group over a message received from a vehicle not included in the group.

Preferentially processing may refer to applying a predetermined weight value to a message of a vehicle included in the group. Here, a message received from a vehicle not included in the group affects the vehicle to degree weaker than the message received from the vehicle included in the group.

Or, a message received from a vehicle not included in the group may be disregarded. That is, a message received from a vehicle not included in the group may be refused to receive or may be excluded so as not to be used in various vehicle controlling if it is received.

As a result, when the general driving mode is executed, the vehicle control apparatus uses every received message, but when the group driving mode is executed, the vehicle control apparatus selectively uses a received message.

In cases where messages received in the general driving mode is greater than a reference value, a load may occur, and the vehicle control apparatus may erroneously operate due to a malicious message generated by a hacker. Here, filtering may be basically performed by an anti-hacking algorithm, but every malicious message may not be blocked.

Meanwhile, in the group driving mode, only a message of a vehicle included in a reliable group is selectively used, and thus, a load is smaller than that of the general driving mode and a message is not required to be verified.

Vehicles in group driving may more accurately define a spatial relationship on the basis of mutually shared sensor information and realize group driving on the basis of the spatial relationship.

Figure 12:
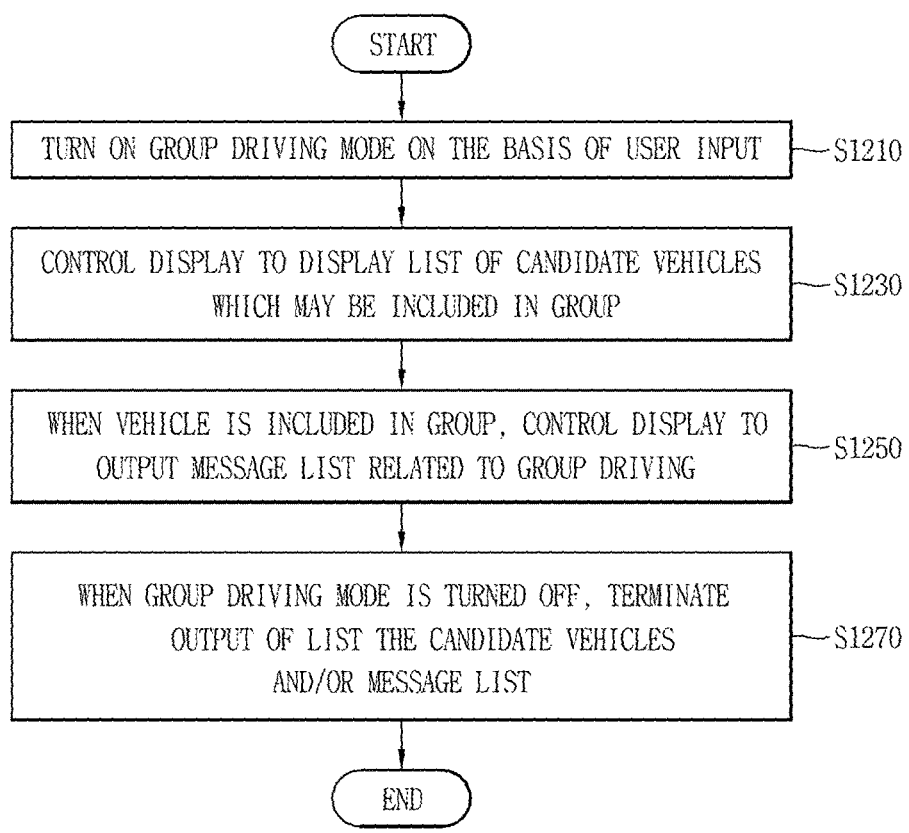
FIG. 12 is a flow chart illustrating a control method of a vehicle control apparatus according to an embodiment of the present disclosure.

FIG. 12 is a flow chart illustrating a control method of a vehicle control apparatus according to an embodiment of the present disclosure, and FIGS. 13A, 13B, 13C, 13D, 13E, and 13F are views illustrating an operation of a display according to the control method of FIG. 12.

The vehicle control apparatus includes a display, a wireless communication unit transmitting and receiving a message to and from a certain vehicle positioned within a predetermined range, and a controller controlling the display and the wireless communication unit. Hereinafter, an operation of the vehicle control apparatus may be performed by the controller.

Figure 13A:
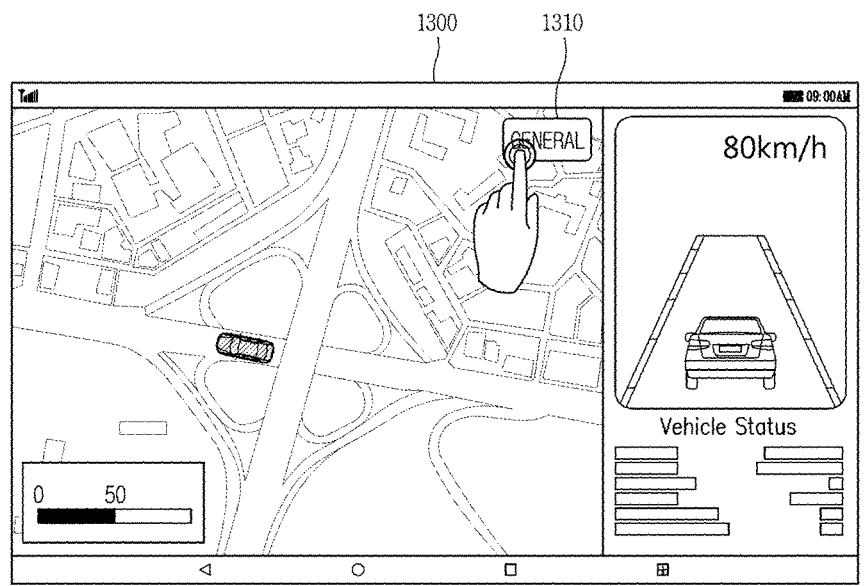
FIGS. 13A, 13B, 13C, 13D, 13E, and 13F are views illustrating an operation of a display according to the control method of FIG. 12.

The display is provided for a passenger of a vehicle, and may be installed in various positions within the vehicle. AS illustrated in FIG. 13A, a map image including a point where a vehicle is positioned may be displayed on the display 1300. A scale icon guiding scale of the map may be displayed on the map image. Also, driving information of the vehicle may be additionally displayed. The driving information may include at least one of a speed of the vehicle, a driving direction, and at least one of a latitude, a longitude, and an altitude of a point where the vehicle is positioned.

In addition, a graphic object 1310 calculating an amount of messages received by the vehicle during a unit time and indicating the calculated amount of messages may be output on the display 1300.

A message received through the wireless communication unit may be various types of data or information exchanged through V2X communication. For example, the message may be sensor information sensed by a different vehicle using a sensor thereof or road information transmitted from an infrastructure such as a traffic light, or the like. Thus, the predetermined range refers to a maximum range in which a message may be transmitted with respect to a vehicle.

Meanwhile, the vehicle control apparatus may turn on or off the group driving mode on the basis of a user input (S1210). In detail, the general driving mode may be switched to the group driving mode or the group driving mode may be switched to the general driving mode according to a user input.

The user input for turning on or off the group driving mode may be input in various manners.

For example, in cases where a driving mode icon 1310 guiding a driving mode of the vehicle is displayed on the display 1300 and a touch is applied to the driving mode icon 1310, the general driving mode may be switched to the group driving mode or the group driving mode may be switched to the general driving mode.

When the group driving mode is turned on, the vehicle control apparatus may control the display to display a list of candidate vehicle which may be included in a group (S1230).

As described above, group driving refers to driving in which vehicles included in a group share sensor information sensed by each vehicle and drive using an object map obtained by fusing sensor information of its own and sensor information of another vehicle.

Thus, in order to perform group driving, a group is required to be set and at least one different vehicle is required to be included in the group. To this end, when the group driving mode is turned on, the vehicle control apparatus may output a user interface designed to set a group on the display.

The user interface includes a list of a candidate vehicle. Here, the candidate vehicle refers to a different vehicle positioned within a predetermined range with respect to the vehicle. The vehicle control apparatus may search for a candidate vehicle using various sensors provided in the vehicle or may search for a candidate vehicle on the basis of a message received from a different vehicle. The vehicle control apparatus may also broadcast a predetermined message for searching for a candidate vehicle, and search for a candidate vehicle on the basis of a response message with respect to the predetermined message.

Figure 13B:
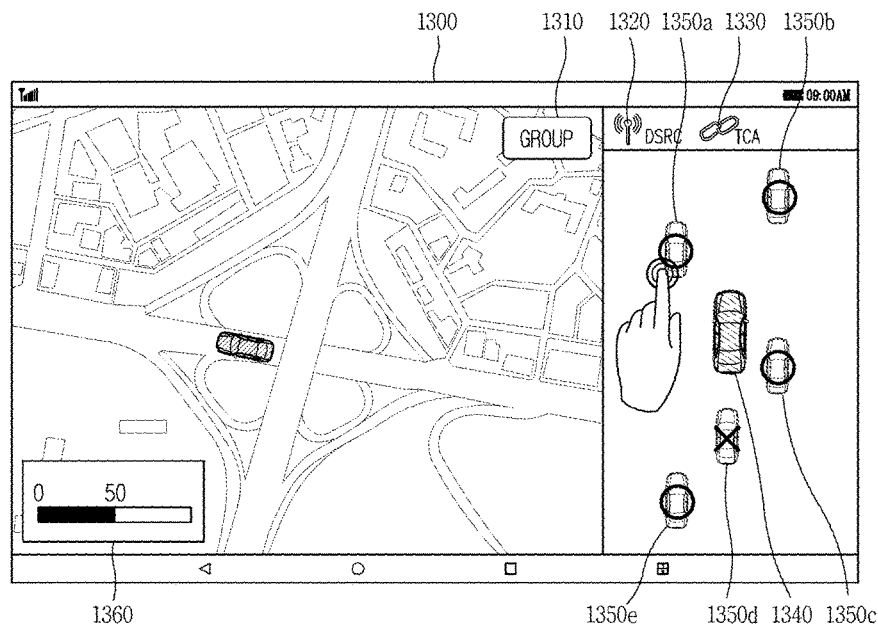

When a list of candidate vehicles is displayed, as illustrated in FIG. 13B, at least one sub-objects 1350a to 1350e indicating candidate vehicles may be displayed on the display 1300.

Hereinafter, in order to differentiate a vehicle having the vehicle control apparatus from a candidate vehicle, the vehicle controlled by the vehicle control apparatus will be referred to as a "main vehicle".

The vehicle control apparatus may display a main object 1340 corresponding to the main vehicle together with sub-objects 1350a to 1350e. Here, positions at which the respective sub-objects are display may be varied depending on relative positions of respective candidate vehicles in relation to the main vehicle in real time. That is, the display positions of the sub-objects reflect actual positions of the candidate vehicles.

For example, through a first sub-object 1350a, it can be recognized that a first candidate vehicle is positioned at a point of 11 o'clock of the main vehicle, and through a second sub-object 1350b, it can be recognized that a second candidate vehicle is positioned at a point of 1 o'clock of the main vehicle.

A distance between a sub-object and the main object reflects a distance between a candidate vehicle and the main vehicle. For example, since the second sub-object 1350b is farther than the first sub-object 1350a, it can be recognized that the second candidate vehicle is farther from the second candidate vehicle than the first candidate vehicle.

The sub-objects may have different images according to types and/or manufacturers of candidate vehicles. Here, different images may refer to images different in shape, length, color, and the like.

Also, the sub-objects may have different images according to whether a candidate vehicle is able to perform V2X communication or whether a candidate vehicle is included in a group.

For example, sub-objects may be varied according to whether a candidate vehicle is able to perform V2X communication. For example, since V2X communication with a first candidate vehicle is possible, the first sub-object 1350a includes a circular image and V2X communication with a fourth candidate vehicle is not possible, the fourth sub-object 1350d may include an X image. The user may recognize whether a candidate vehicle can be added to a group through the image included in a sub-object by intuition.

Meanwhile, the vehicle control apparatus may control the wireless communication unit such that a group request message is transmitted to at least one candidate vehicle selected by a user input from the list. When an approval message regarding the group request message is received, a candidate vehicle which has transmitted the approval message may be added to a group.

For example, as illustrated in FIG. 13B, when the first sub-object 1350a is touched, the vehicle control apparatus may transmit a group request message to the first candidate vehicle corresponding to the first sub-object 1350a. When a passenger of the first candidate vehicle approves and an approval message is transmitted from the first candidate vehicle to the main vehicle, the main vehicle and the first candidate vehicle may be grouped to start group driving.

When a list of candidate vehicles is displayed, a vehicle included in the group on the list of the candidate vehicles may be highlighted such that the vehicle included in the group and a vehicle not included in the group may be distinguished from each other.

Figure 13C:
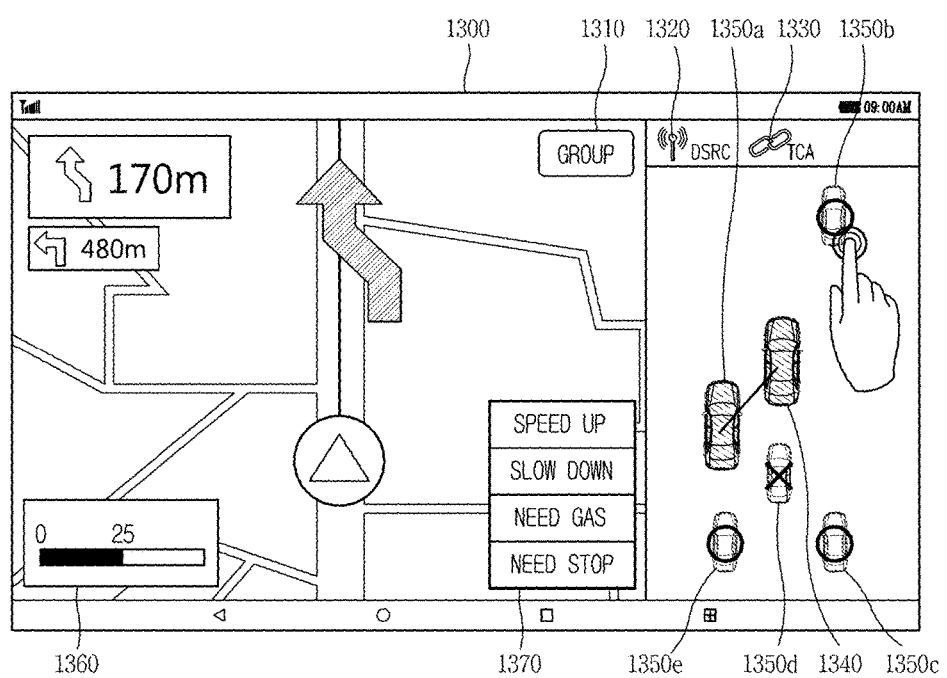

For example, as illustrated in FIG. 13C, the first sub-object 1350a indicating the first candidate vehicle included in the group may be highlighted unlike the other sub-objects 1350b to 1350e. Also, a connection line indicating that the first candidate vehicle and the main vehicle are connected may be further displayed.

Similarly, the user may transmit a group request message to a second candidate vehicle corresponding to the second sub-object 1350b by applying a touch to the second sub-object 1350b. Thereafter, when an approval message is received from the second candidate vehicle, the second candidate vehicle may be added to the group and the main vehicle and the first and second candidate vehicles may perform group driving.

In cases where the main vehicle transmits a group request message to the second candidate vehicle in a state in which a group is already set, an approval message of the second candidate vehicle may be transmitted every vehicle included in the group. The second candidate vehicle may transmit the approval message only to the main vehicle which has transmitted the group request message, and the main vehicle may transmit a notification message indicating that the second candidate vehicle is included in the group to the other vehicles included in the group.

Meanwhile, when the group driving mode is turned on, a pairing icon 1330 indicating whether a different vehicle is included in the group may be displayed. The user may check whether a vehicle is included in the group through the pairing icon 1330.

Meanwhile, a scale of a map displayed on the display 1300 may be changed according to whether a vehicle is included in the group and according to a position of a vehicle included in the group. In detail, the vehicle control apparatus may control the display 1300 such that a map including a position of the main vehicle is displayed, and may change a scale of the map on the basis of at least one of whether a vehicle is included in the group and a position of a vehicle included in the group.

For example, as illustrated in FIG. 13B, when a different vehicle is not included in a group, a scale may be adjusted such that a maximal area in which a candidate vehicle is searched is displayed on the map. Accordingly, the user may recognize candidate vehicles that can be added to the group and positions of the respective candidate vehicles at a glance.

In another example, as illustrated in FIG. 13C, when vehicles are included in the group, the scale may be adjusted such that all the vehicles included in the group are displayed on the map. Here, the scale of the map may be varied with respect to a foremost vehicle and a rearmost vehicle on the basis of the main vehicle, among the different vehicles included in the group. For example, as a preceding vehicle becomes away from the main vehicle, a scale denominator of the map may be increased, and as the preceding vehicle is closer to the main vehicle, the scale denominator of the map may be reduced.

Meanwhile, when a vehicle is included in the group, the vehicle control apparatus controls the display to output a message list related to group driving (S1250).

When group driving starts, vehicles included in the group may share various group driving functions, and the vehicle control apparatus may display a message list for the user to select a group driving function to be executed.

When at least one message is selected from the message list, the vehicle control apparatus control the wireless communication unit such that the selected message is transmitted to a vehicle included in the group.

Figure 13D:
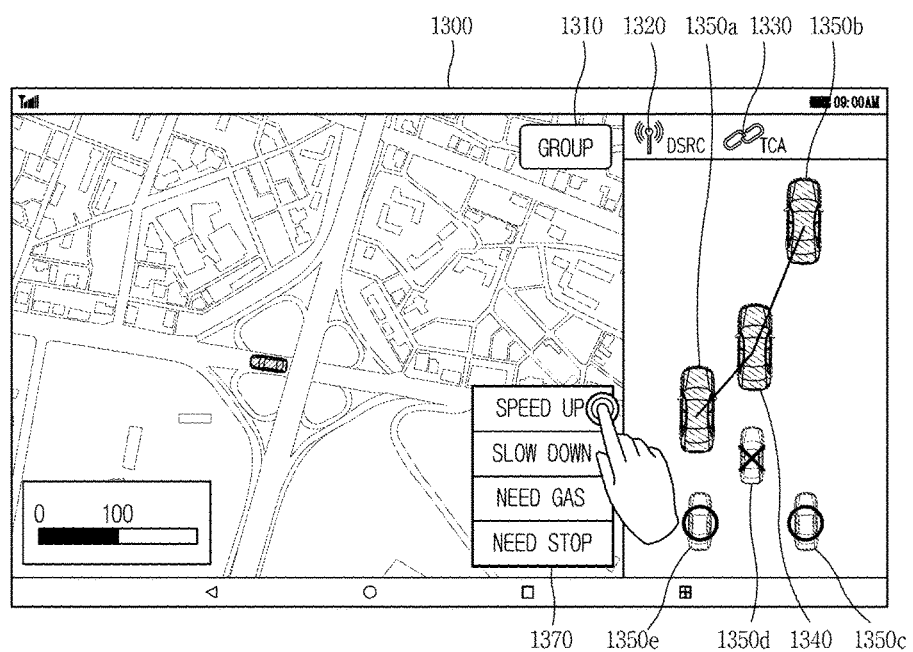

For example, as illustrated in FIG. 13D, the message list 1370 may include an acceleration message, and the acceleration message may be selected by a passenger placed in the first vehicle. Since the first and second candidate vehicles are included in the group, the acceleration message is transmitted from the main vehicle to the first and second candidate vehicles.

When a plurality of vehicles are included in the group, the selected message may be selectively transmitted to one or more vehicles selected by a user input from among the vehicles included in the group. For example, the selected message may be transmitted to at least one of the first and second candidate vehicles included in the group, selected by the user.

Here, the message list 1370 includes messages to be transmitted to the different vehicle included in the group. Each message corresponds to a group driving function to be executed by at least one vehicle included in the group. The message list 1370 may be considered as a menu including group driving functions to be commonly executable by vehicles included in the group.

Any one function that can be executed as the group driving function may be deceleration, acceleration, parking, change in a lane, adjustment of a space between vehicles, a change in a master vehicle as a reference of group driving, and a change in a destination.

An executed group driving function may be varied according to a message selected by the user. For example, when a deceleration message is selected, a deceleration function may be executed, and when an acceleration message is selected, an acceleration function may be executed.

Although not shown, the vehicle control apparatus may edit or delete a message included in the message list 1370 or add a new message to the message list 1370 on the basis of a user input.

For example, the deceleration message may be corrected to "please step down from current speed to 10 km/h" or to "please step down to 90% from current speed". When a different vehicle receives the deceleration message, the different vehicle may execute a deceleration function according to a condition included in the deceleration message.

In another example, a backing message such as "please back 10 meters or greater" may be newly added. When the different vehicle receives the backing message, the different vehicle may execute a backing function according to a condition included in the backing message.

Meanwhile, when at least one of messages of the message list 1370 is selected, a group driving function corresponding to the selected message may be executed in at least one of vehicles included in the group. The group driving function may be executed in all the vehicles included in the group or may be limitedly executed in a specific vehicle selected by the user.

Hereinafter, an embodiment in which every vehicle included in a group executes a group driving function corresponding to a selected message will be described for the purposes of description.

When a different vehicle receives a message including a group driving function, the different vehicle may wait for execution of the group driving function in order to receive an approval of the group driving function from a passenger placed in the different vehicle, and output notification information indicating a request from the main vehicle in a visual, audible, and tactile manner.

When the passenger of the different vehicle approves execution of the group driving function, the different vehicle transmits an approval message to the main vehicle. However, when the passenger of the different vehicle rejects execution of the group driving function, the different vehicle transmits a rejection message to the main vehicle.

Figure 13E:
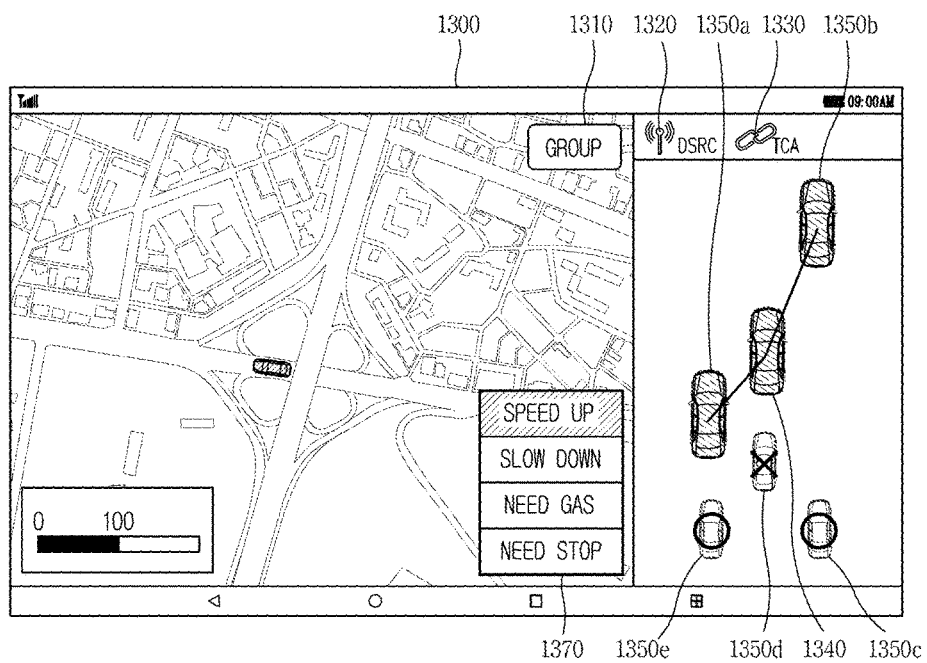
Figure 13F:
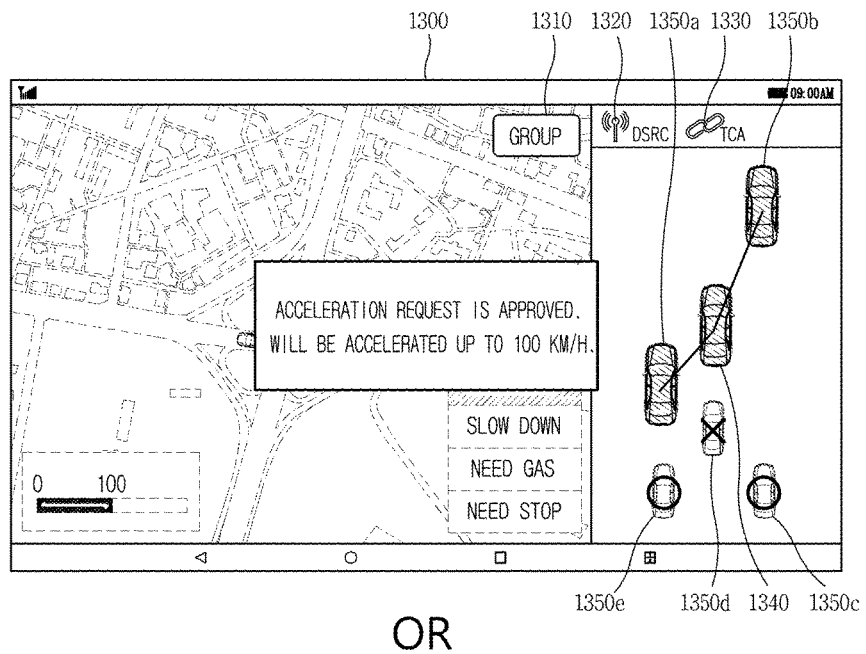
Figure 13F:
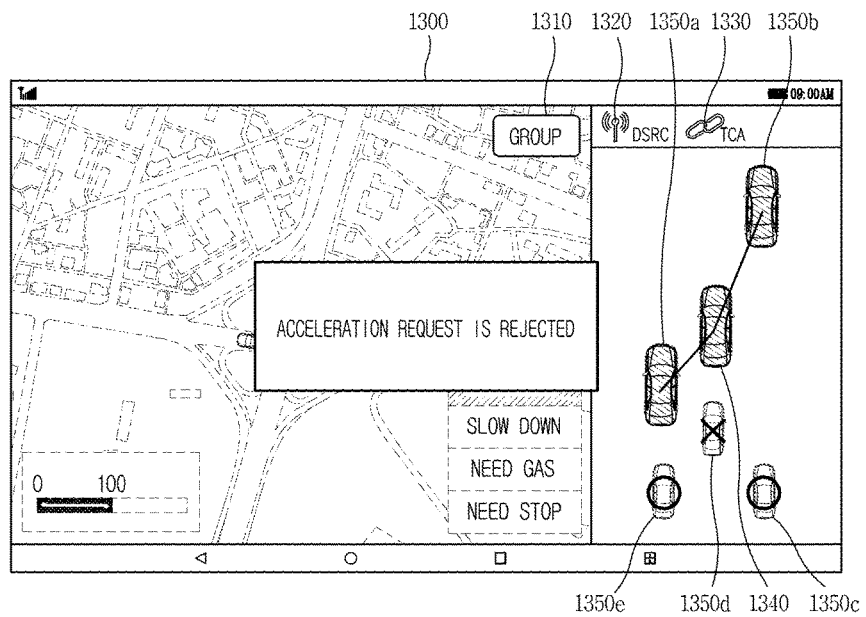

The vehicle control apparatus of the main vehicle waits for receiving an approval message or a rejection message. Also, the vehicle control apparatus may output information for guiding a waiting state. For example, when a "SPEED UP" message is selected as illustrated in FIG. 13D, a notification effect indicating that an approval regarding the "SPEED UP" message is awaited may be generated on the display 1300 as illustrated in FIG. 13E.

When approval messages are received from all the vehicles, the vehicle control apparatus of the main vehicle executes the group driving function. Also, the vehicle control apparatus may output guide information guiding the executed group driving function. For example, as illustrated in the upper drawing of FIG. 13F, guide information indicating that an acceleration request is approved and thus acceleration is performed and a target speed is 100 km/h may be output on the display 1300.

Meanwhile, when a rejection message, rather than an approval message, is received from at least one different vehicle, execution of the group driving function is limited and the display is controlled to output notification information indicating that a rejection message has been received. When the rejection message is received from any one of a plurality of vehicles, all of the plurality of vehicles do not execute the group driving function. Here, the vehicle control apparatus of the main vehicle may output guide information indicating that the request message has been rejected. For example, as illustrated in the lower drawing of FIG. 13F, guide information including a reason why the group driving function cannot be executed may be output on the display 1300.

As a result, when approval messages are generated by all the vehicles, the group driving function may be executed, and when a rejection message is generated by at least one vehicle, the group driving function is not executed. This is because the vehicles included in the group may move out from a predetermined range available for communication due to different controlling.

Meanwhile, when the different vehicle receives a message from the main vehicle, the different vehicle may immediately execute the group driving function corresponding to the message in response to the request from the main vehicle. In other words, even without an approval of the passenger placed in the different vehicle, the different vehicle may autonomously execute the group driving function in response to the request from the main vehicle. Here, when the message is selected by the user, the main vehicle may execute a group driving function corresponding to the selected message, and when the different vehicle receives the message from the main vehicle, the different vehicle may execute the group driving function included in the received message.

Figure 14:
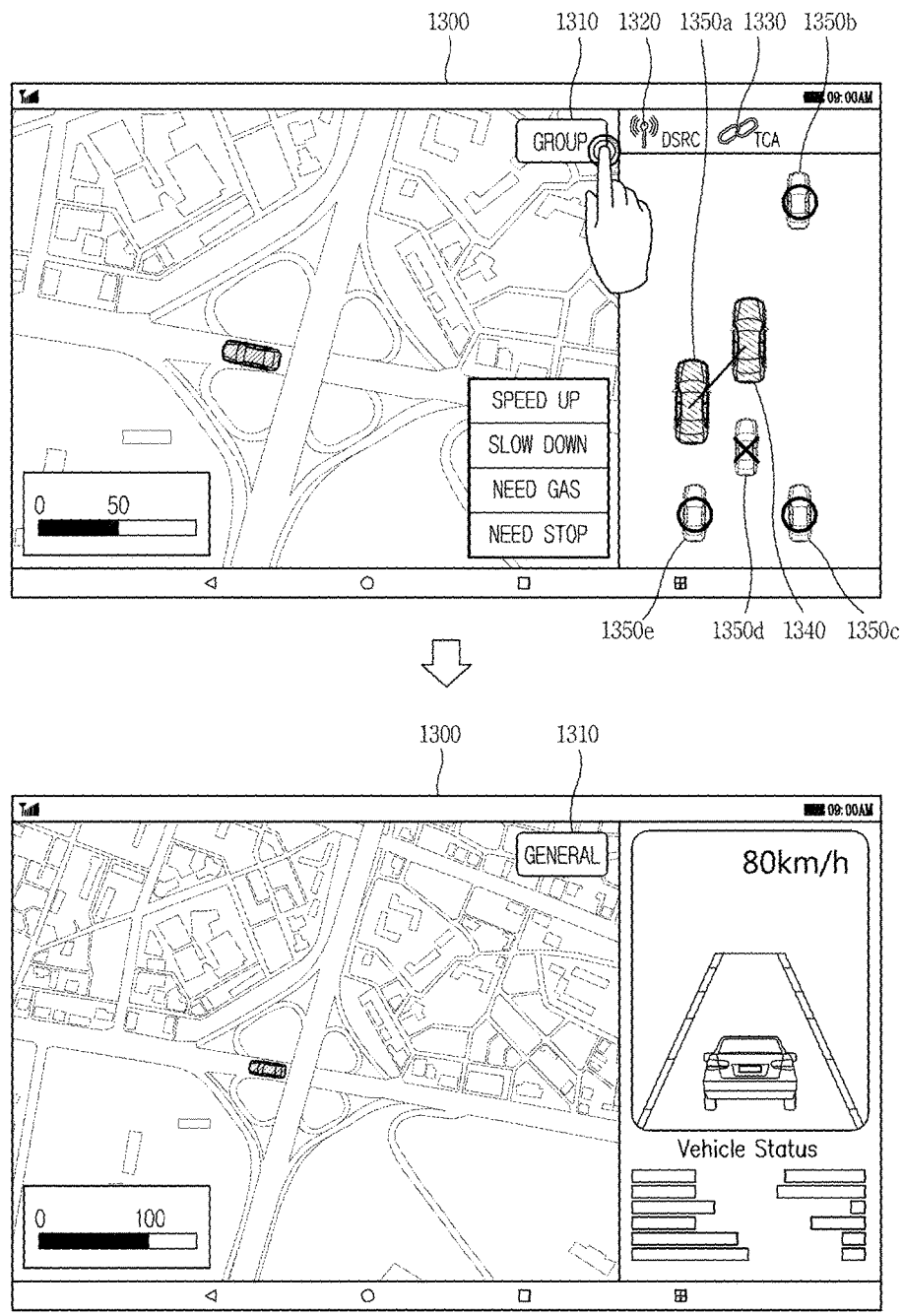
FIG. 14 is a view illustrating an operation when a group driving mode is turned off.

Meanwhile, when the group driving mode is turned off, the vehicle control apparatus terminates output of the list of the candidate vehicles and/or the message list (S1270). For example, as illustrated in FIG. 14, when a touch is applied to the driving mode icon 1310 guiding a driving mode of the vehicle, the group driving mode may be switched to the general driving mode. Thereafter, the vehicle control apparatus may generate an object map using a message received from an unspecific vehicle according to the general driving mode.

In addition, when the group driving mode is turned off in a state in which a group is set, the group is released. This is because a message received from a different vehicle includes position information of a passenger placed in the vehicle. The user should newly set a group each time the group driving mode is executed, and receive an approval regarding sharing position information from the passenger of the different vehicle.

As the group is released, the scale of the map based on the position of the different vehicle included in the group may be changed with respect to navigation information to be provided to the passenger. Accordingly, the passenger of the vehicle may use the map image in a state of being optimized for a situation.

Figure 15:
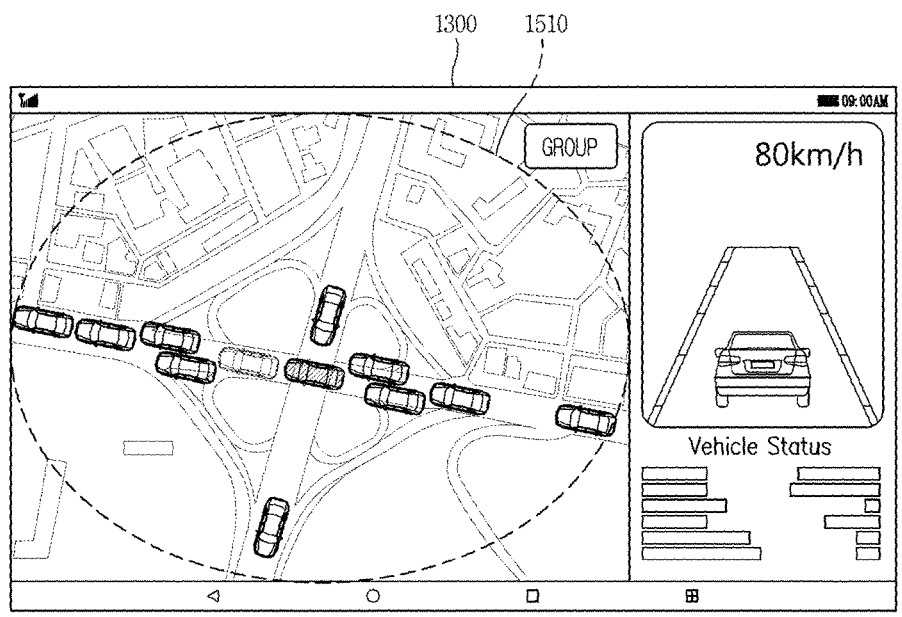
FIG. 15 is a view illustrating an example in which a scale of a map displayed on a display is changed according to the presence and absence of a vehicle included in a group.
Figure 15:
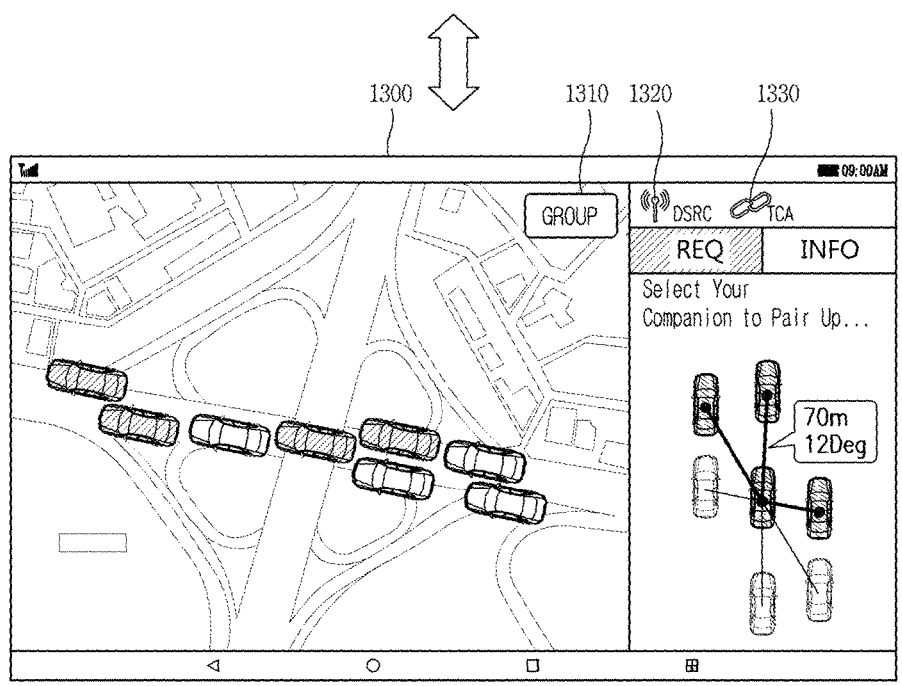

FIG. 15 is a view illustrating an example in which a scale of a map displayed on a display is changed according to the presence and absence of a vehicle included in a group.

The vehicle control apparatus may change a scale of a map displayed on the display 1300 according to whether a vehicle is included in a group. When a vehicle is not included in the group, a scale is adjusted such that a maximum area for searching for a candidate vehicle is displayed on the map. Here, a reference line 1510 guiding the maximum region may be displayed on the map image.

At least one sub-object indicating a candidate vehicle which can be added to the group may be displayed on the map image.

In addition, the vehicle control apparatus may change the scale of the map displayed on the display 1300 according to a position of a vehicle included in the group. The scale may be changed such that a circle based on the main vehicle in which a distance from the main vehicle to a different vehicle farthest from the main vehicle is a radius is included in the map image. For example, as the different vehicle farthest from the main vehicle becomes away from the main vehicle, the scale denominator of the map may be increased, and as the different vehicle is closer to the main vehicle, the scale denominator of the map may be reduced.

Meanwhile, when the different vehicle included in the group moves away from an area in which a message can be transmitted and received, the group driving may be stopped. In order to prevent the group driving from being stopped, when the different vehicle moves out from a reference distance with respect to the main vehicle, the main vehicle may transmit a warning message to the different vehicle. In response to the warning message, the different vehicle may perform autonomous driving so as to be positioned within a range in which communication can be performed or may output guide information indicating the range.

Hereinafter, a vehicle system including a main vehicle and a different vehicle included in a group in a state in which the group is set will be described in detail.

Figure 16:
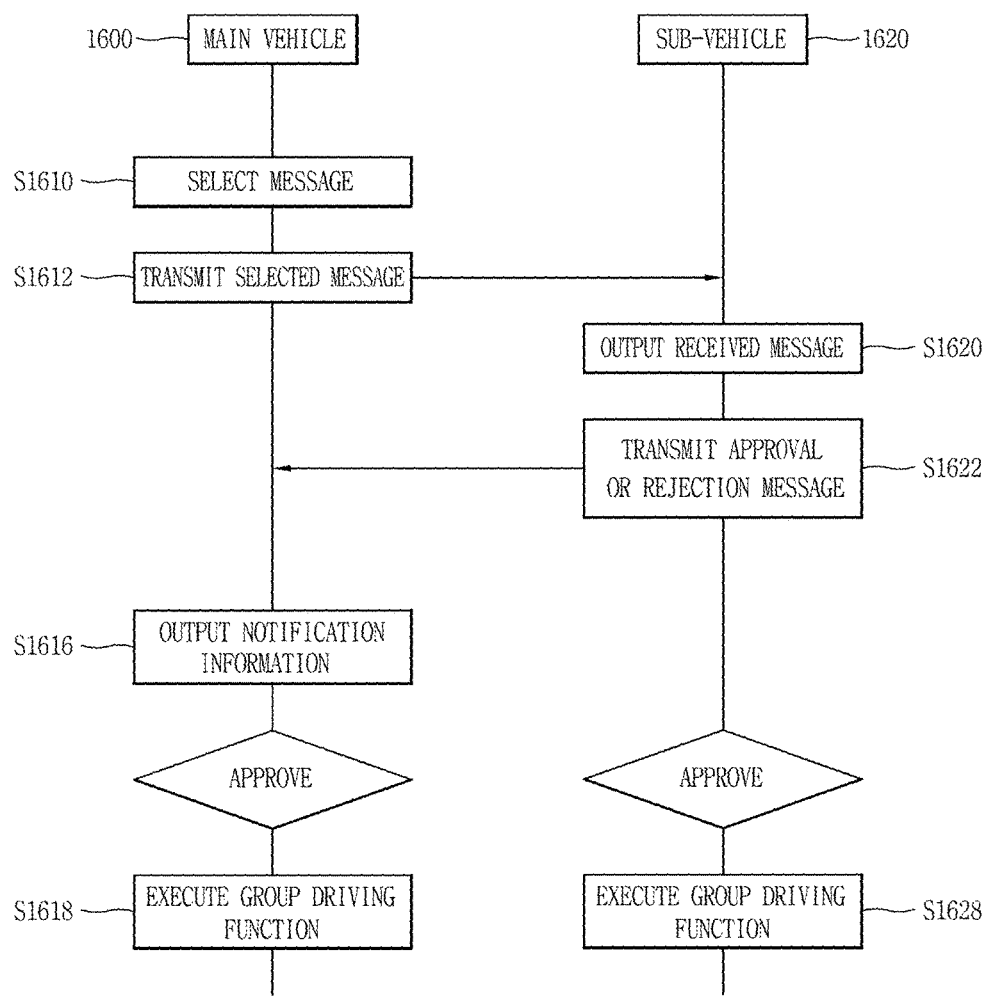
FIG. 16 is a flow chart illustrating a vehicle system in accordance with group driving.
Figure 17A:
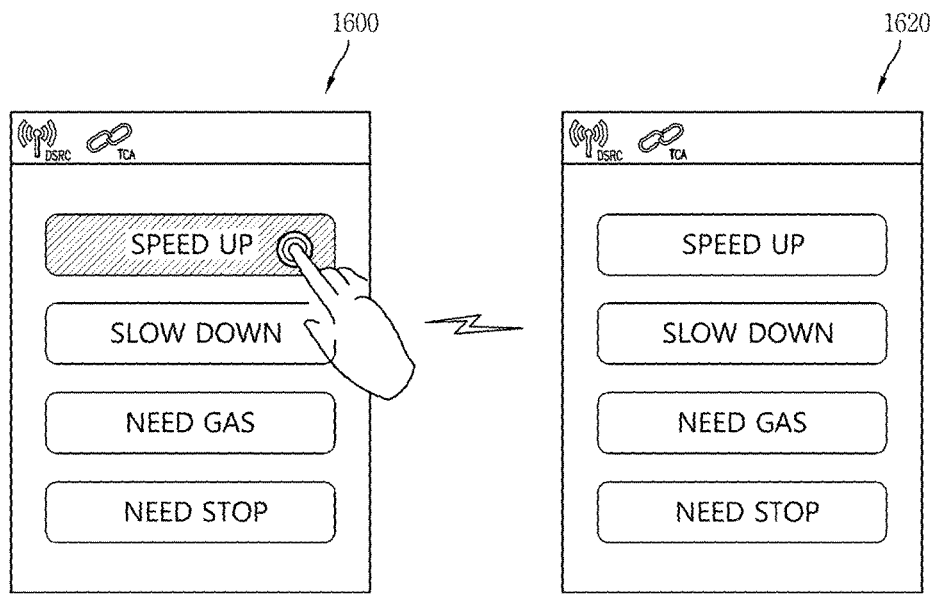
FIGS. 17A, 17B, and 17C are views illustrating a plurality of vehicles in accordance with a control method of FIG. 16.
Figure 17B:
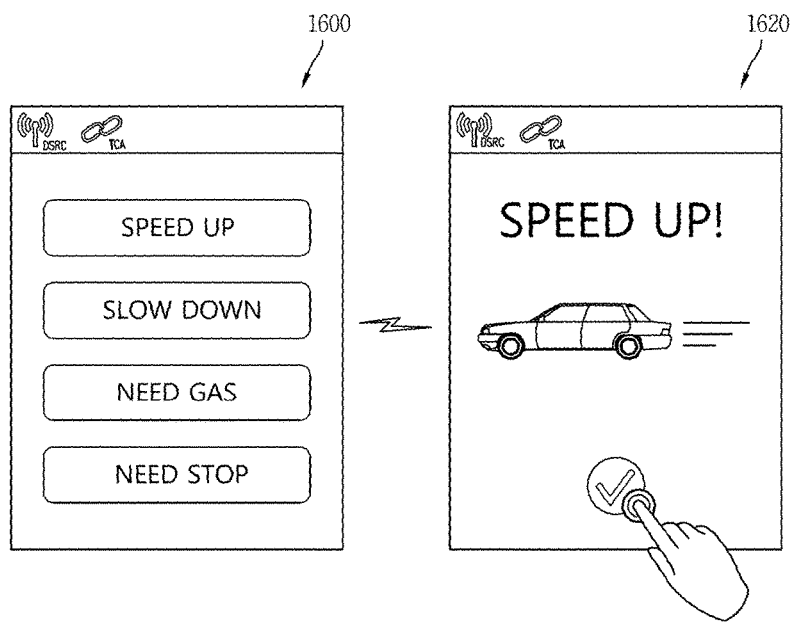
Figure 17C:
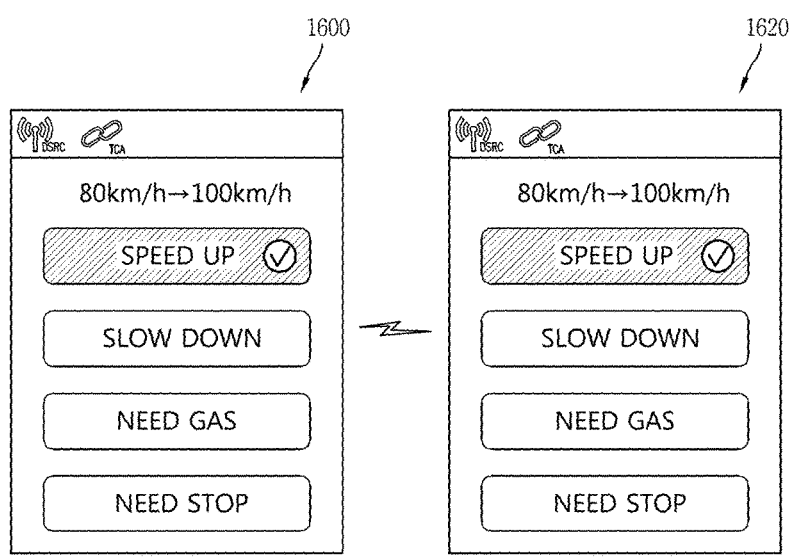

FIG. 16 is a flow chart illustrating a vehicle system in accordance with group driving, and FIGS. 17A, 17B, and 17C are views illustrating a plurality of vehicles in accordance with a control method of FIG. 16.

Referring to FIG. 16, the vehicle system may include a main vehicle 1600 and a sub-vehicle 1620. The sub-vehicle 1620 is a different vehicle included in the group and a plurality of sub-vehicles may be included in the vehicle system. Here, for the purposes of description, a case in which the main vehicle and one sub-vehicle are included in a group will be described as an example.

Since the group is set and group driving is performed, a message list is output on a display of each of the main vehicle 1600 and the sub-vehicle 1620.

An occupant of the main vehicle 1600 may select any one of messages on the message list (S1610). Here, the selected message is transmitted to the sub-vehicle 1620 as a different vehicle included in the group (S1610). For example, as illustrated in FIG. 17A, when "SPEED UP" message is selected, the corresponding message is transmitted to the sub-vehicle 1620.

Next, the sub-vehicle 1620 outputs a received message (S1620). For example, as illustrated in FIG. 17B, the sub-vehicle 1620 may output guide information indicating that "SPEED UP" request has been received, and output a user interface allowing for selecting whether the corresponding request is to be approved or rejected. The main vehicle 1600 may generate a notification effect indicating that an approval of the different vehicle is awaited regarding the selected "SPEED UP".

When an approval or a rejection is input, the sub-vehicle 1620 transmits an approval message or a rejection message to the main vehicle 1600 (S1622). The main vehicle 1600 outputs guide information on the basis of a message received from the sub-vehicle 1620 (S1616).

In the case of approval, the sub-vehicle 1620 executes a group driving function corresponding to the received message (S1628). The main vehicle 1600 executes the group driving function in response to the approval message received from the sub-vehicle 1620 (S1618).

As the group driving function is executed, guide information indicating the group driving function may be output from a display of each of the main vehicle 1600 and the sub-vehicle 1620.

Meanwhile, vehicles included in the group may perform group driving toward the same destination. Here, a master vehicle as a reference of road guidance is selected and road guide information of vehicles included in the group may be provided with respect to the master vehicle.

An case in which a first vehicle and a second vehicle are included in a group will be described as an example. The first vehicle is a main vehicle including a vehicle control apparatus, and the second vehicle is a master vehicle as a reference of road guidance.

Figure 18:
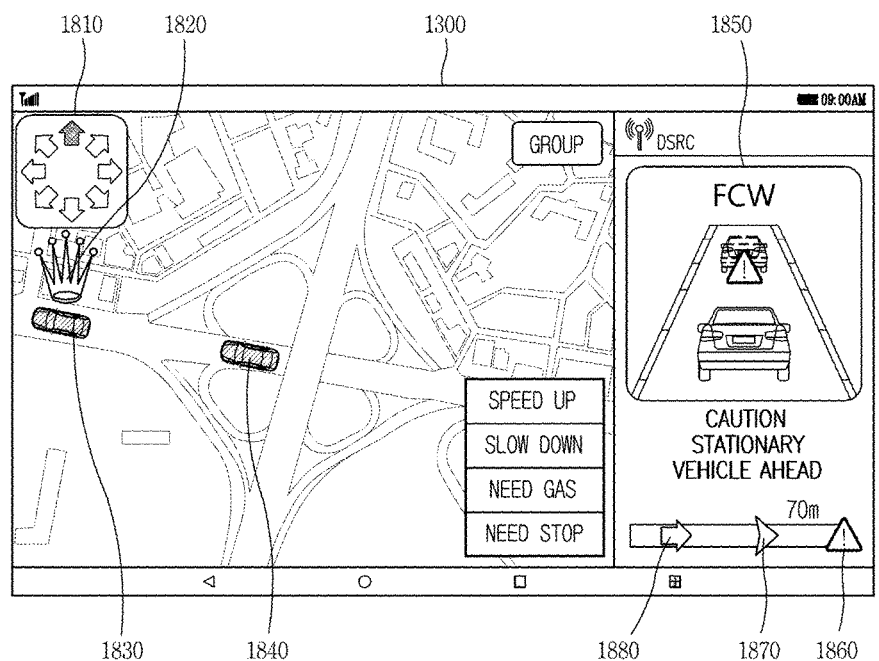
FIG. 18 is a view illustrating a navigation screen displayed during group driving.

Referring to FIG. 18, a main object 1840 corresponding to the first vehicle and a sub-object 1830 corresponding to the second vehicle may be displayed on a map image. An icon 1820 for guiding the master vehicle may be additionally displayed.

An image 1810 guiding a relative position of the master vehicle may be displayed on the vehicles included in the group. For example, in the case of the first vehicle, the image 1810 may indicate a direction regarding a position of the second vehicle with respect to a direction in which the first vehicle is driving.

Meanwhile, master notification information for warning or guiding an occupant with respect to a position of the master vehicle may be generated in the master vehicle. For example, in cases where a vehicle paused at 70 meters away ahead of the master vehicle is detected, the master vehicle may output master notification information warning about the paused vehicle. The master notification information is transmitted as a V2X message to the different vehicle included in the same group.

The first vehicle may output notification information indicating that there is a vehicle stopped 70 meters away in front of the master vehicle on the basis of the master notification information. That is, the first vehicle may output notification information on the basis of the message received from the master vehicle, regarding an object not sensed by a sensor of the first vehicle.

Here, the first vehicle may guide a warning position 1860 indicating a point for the occupant to pay attention, a master vehicle position 1870 indicating a position of the master vehicle, and a current position 1880 indicating a position of the first vehicle to the user in a visual, audible, and tactile manner.

In the related art, road guide information is provided only on the basis of a vehicle in which an occupant is placed, but the vehicle control apparatus in accordance with the present disclosure may provide road guide information with respect to a master vehicle included in group driving. Thus, occupants of all the vehicles performing group driving may check the same warning and recognize when to be attentive through comparison with a position of the master vehicle, by intuition.

Figure 19:
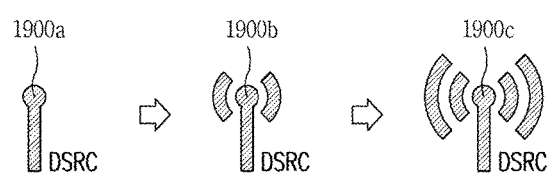
FIG. 19 is a view illustrating a method for visually guiding an amount of messages received by a vehicle.

FIG. 19 is a view illustrating a method for visually guiding an amount of messages received by a vehicle.

The vehicle control apparatus may calculate an amount of messages received by the vehicle for a unit time, and output a graphic object indicating the calculated amount of messages. The messages may be messages received from different vehicles positioned within a predetermined range through V2X communication.

For example, as illustrated in FIG. 19, when the amount of messages received per unit time is smaller than a first reference, a first graphic object 1900a may be displayed, and when the amount of messages received per unit time is greater than a second reference, a third graphic object 1900c may be displayed. When the amount of messages received per unit time is greater than the first reference and smaller than the second reference, a second graphic object 1900b may be displayed.

An occupant may recognize how many V2X messages are received from different vehicles by intuition through the graphic objects.

Meanwhile, a reference of the graphic object may be varied according to the general driving mode or the group driving mode. In the general driving mode, a message received from an unspecific vehicle is used, but in the group driving mode, a message received from a vehicle included in a group is selectively used.

When the group driving mode is turned on, the graphic object indicates an amount of messages received from vehicles included in the group for the unit time, and when the group driving mode is turned off, the graphic object indicates an amount of messages received from every vehicle for the unit time. That is, in the group driving mode, although messages are received from unspecific vehicles, an amount of messages received per unit time is calculated on the basis of messages received from vehicles included in the group.

The present disclosure may extend to the vehicle including the vehicle control apparatus described above with reference to FIGS. 8 to 19.

The present invention described above may be implemented as a computer-readable code (or an application or software) in a medium in which a program is recorded. The method for controlling an autonomous driving vehicle may be realized by a code stored in a memory, or the like.

The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A vehicle control apparatus for a vehicle, the vehicle control apparatus comprising:
    a display unit;
    a wireless communication unit configured to transmit and receive a message to and from at least one other vehicle positioned within a predetermined range from the vehicle;
    at least one processor; and
    a computer-readable medium coupled to the at least one processor having stored thereon instructions which, when executed by the at least one processor, causes the at least one processor to perform operations comprising:
        receiving, via the wireless communication unit, the message from the other vehicle;
        receiving user input comprising control input that activates or deactivates a group driving mode of the vehicle;
        determining that the group driving mode is active; and
        instructing the display unit to display a graphical representation of the at least one other vehicle positioned within the predetermined range to be added to a driving group comprising one or more member vehicles,
    wherein the operations further comprise:
        instructing the display unit to display a map indicating a position of the vehicle,
        based on no member vehicle of the driving group being displayed in the map while the group driving mode is active, instructing the display unit to change a scale of the map such that a maximum area for searching for the at least one other vehicle is displayed in the map, and
        based on the member vehicles of the driving group being displayed while the group driving mode is active, instructing the display unit to change the scale of the map based on a relative position of the member vehicles of the driving group.

2. The vehicle control apparatus of claim 1, wherein the operations comprise:
    instructing the display unit to display a list of request messages associated with the group driving mode;
    receiving the user input comprising a selection of at least one request message of the displayed list of request messages; and
    instructing the wireless communication unit to transmit the selected request message to the member vehicles of the driving group.

3. The vehicle control apparatus of claim 2, wherein the operations comprise:
    determining that approval messages approving the transmitted request message are received from corresponding member vehicles; and
    controlling the vehicle based on a group driving operation associated with the selected request message.

4. The vehicle control apparatus of claim 3, wherein the operations comprise:
    determining that a rejection message disapproving the transmitted request message is received from at least one member vehicle; and
    instructing the display unit to display notification information indicating the receiving of the rejection message.

5. The vehicle control apparatus of claim 3, wherein the group driving operation is any one of deceleration, acceleration, parking, lane change, following distance adjustment, destination change, and a change of master vehicle used as a reference vehicle for the group driving mode.

6. The vehicle control apparatus of claim 2, wherein the instruction to the wireless communication unit comprises transmitting the selected request to a selected group of the member vehicles, the selected group set based on the user input comprising a selection of vehicles.

7. The vehicle control apparatus of claim 2, wherein the operations comprise modifying the list of the request messages, the modification comprising at least one of:
    editing a request message included in the list of the request messages;
    deleting a request message included in the list of the request messages; or
    adding a new request message to the list of the request messages.

8. The vehicle control apparatus of claim 1, wherein the operations comprise processing the message received by the wireless communication unit based on an activation status of the group driving mode.

9. The vehicle control apparatus of claim 8, wherein the operations comprise:
    processing a received message originating from the one or more member vehicles with a higher priority over a received message originating from a non-member vehicle that is not included in the driving group.

10. The vehicle control apparatus of claim 8, wherein the operations comprise:
    disregarding a message received from a non-member vehicle that is not included in the driving group.

11. The vehicle control apparatus of claim 1, wherein the operations comprise:
    receiving the user input comprising a selection of one or more other vehicles displayed by the display unit;
    instructing the wireless communication unit to transmit a group join request message to the selected one or more other vehicles;
    determining that at least one approval message approving the transmitted group join request message is received from the selected one or more other vehicles; and
    adding the other vehicle associated with the approval message to the driving group as a member vehicle.

12. The vehicle control apparatus of claim 11, wherein the operations comprise:
    determining non-member vehicles based on receiving a rejection message disapproving the transmitted group join request message from the selected one or more other vehicles; and instructing the display unit to highlight the member vehicles of the driving group, the highlighting configured to distinguish the member vehicles from the non-member vehicles.

13. The vehicle control apparatus of claim 11, wherein the group driving mode is active, and wherein the operations comprise:
   determining that the control input that deactivates the group driving mode is received; and
   releasing the member vehicles from the driving group.

14. The vehicle control apparatus of claim 1, wherein the operations comprise:
   instructing the display unit to display a main object corresponding to the vehicle and a sub-object corresponding to a member vehicle of the driving group, and
   determining a placement of the sub-object relative to the main object based on a relative position of the member vehicle with respect to the vehicle.

15. The vehicle control apparatus of claim 1, wherein the operations comprise:
   determining that a separation between a first vehicle of the member vehicles and the vehicle is greater than a reference distance; and
   instructing the wireless communication unit to transmit a warning message to the first vehicle.

16. The vehicle control apparatus of claim 1, wherein the operations comprise:
   determining a number of messages received by the wireless communication unit per unit time interval; and
   instructing the display unit to display a graphic object that indicates the number of received messages.

17. The vehicle control apparatus of claim 16, wherein the determining of the number of messages received by the wireless communication unit per unit time interval comprises:
   determining whether the group driving mode is active or inactive;
   based on the group driving mode being active, calculating the number of messages based on messages received from the member vehicles; and
   based on the group driving mode being inactive, calculating the number of messages based on all received messages.

18. A vehicle comprising:
   a plurality of wheels;
   a power source configured to drive at least two of the plurality of wheels; and
   a vehicle control apparatus comprising:
      a display unit,
      a wireless communication unit configured to transmit and receive a message to and from at least one other vehicle positioned within a predetermined range from the vehicle,
      at least one processor, and
      a computer-readable medium coupled to the at least one processor having stored thereon instructions which, when executed by the at least one processor, causes the at least one processor to perform operations comprising:
         receiving, via the wireless communication unit, the message from the other vehicle,
         receiving user input comprising control input that activates or deactivates a group driving mode of the vehicle,
         determining that the group driving mode is active, and
         instructing the display unit to display a graphical representation of the at least one other vehicle positioned within the predetermined range to be added to a driving group comprising one or more member vehicles,
   wherein the operations further comprise:
      instructing the display unit to display a map indicating a position of the vehicle,
      based on no member vehicle of the driving group being displayed in the map while the group driving mode is active, instructing the display unit to change a scale of the map such that a maximum area for searching for the at least one other vehicle is displayed in the map, and
      based on the member vehicles of the driving group being displayed while the group driving mode is active, instructing the display unit to change the scale of the map based on a relative position of the member vehicles of the driving group.

* * * * *